United States Patent
Kameyama et al.

(10) Patent No.: US 6,184,964 B1
(45) Date of Patent: Feb. 6, 2001

(54) ELECTRODE PLATE WITH TWO-LAYER METAL ELECTRODES INCLUDING COPPER OR SILVER LAYER, AND FLATTENED ANTI-OXIDATION AND INSULATING LAYERS

(75) Inventors: Makoto Kameyama, Funabashi; Hiroyuki Suzuki; Toshiaki Yoshikawa, both of Yokohama; Junri Ishikura, Tokyo, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/328,468

(22) Filed: Jun. 9, 1999

Related U.S. Application Data

(62) Division of application No. 08/814,318, filed on Mar. 11, 1997.

(30) Foreign Application Priority Data

| Mar. 15, 1996 | (JP) | 8-059663 |
| Mar. 22, 1996 | (JP) | 8-066444 |
| May 16, 1996 | (JP) | 8-122011 |

(51) Int. Cl.[7] .................................... G02F 1/1343
(52) U.S. Cl. .................................. 349/147; 349/148
(58) Field of Search .................... 349/148, 147; 257/753, 757

(56) References Cited

U.S. PATENT DOCUMENTS

| 4,712,874 | * | 12/1987 | Sekimura et al. | 349/106 |
| 4,778,560 |   | 10/1988 | Takeda et al. | 349/147 |
| 4,802,743 | * | 2/1989 | Takao et al. | 349/106 |
| 4,853,296 |   | 8/1989 | Fukuyoshi | 429/623 |
| 4,917,471 | * | 4/1990 | Takao et al. | 349/106 |
| 5,101,289 | * | 3/1992 | Takao et al. | 349/106 |
| 5,150,233 |   | 9/1992 | Enomoto et al. | 349/147 |
| 5,212,575 |   | 5/1993 | Kojima et al. | 359/82 |
| 5,717,475 | * | 2/1998 | Kamio et al. | 349/147 |
| 5,777,710 |   | 7/1998 | Okada et al. | 349/138 |
| 5,838,409 |   | 11/1998 | Tomono et al. | 349/148 |

FOREIGN PATENT DOCUMENTS

| 0518296 | 12/1992 | (EP) . | |
| 58-222533 | 12/1983 | (JP) . | |
| 58-222533A | * | 12/1983 | (JP) . | 349/147 |
| 61-046931 | 3/1986 | (JP) . | |
| 2-063019 | 3/1990 | (JP) . | |
| 2-144525 | 6/1990 | (JP) . | |
| 6-347810 | 12/1994 | (JP) . | |
| 7-066423 | 3/1995 | (JP) . | |

OTHER PUBLICATIONS

IBM Tech. Discl. Bulletin, vol. 32, No. 3B (Aug. 1989), pp. 67–68.

* cited by examiner

*Primary Examiner*—James A. Dudek
(74) *Attorney, Agent, or Firm*—Fitzpatrick, Cella, Harper & Scinto

(57) ABSTRACT

An electrode plate, suitable for constituting a liquid crystal device, includes at least a light-transmissive substrate, a plurality of metal electrodes disposed on the light-transmissive substrate and with spacings therebetween, and an insulating layer disposed at the spacings. Each of the metal electrodes includes a first layer, disposed on the light-transmissive substrate comprising a metal or alloy selected from the group consisting of titanium, chromium, molybdenum, tungsten, aluminum, tantalum and nickel, a second layer comprising copper or silver dispersed on the first layer; and a third layer comprising a metal or alloy selected from the group consisting of molybdenum, tantalum, tungsten, titanium, chromium, nickel, aluminum and zinc and disposed on the second layer. The electrode plate is effective in providing a liquid crystal device with good display qualities, a durability and a productivity through improvements in an adhesiveness to the light-transmissive substrate and an antioxidizing property of the metal electrodes.

70 Claims, 18 Drawing Sheets

ELECTRODE PLATE WITH TWO-LAYER METAL ELECTRODES INCLUDING COPPER OR SILVER LAYER, AND FLATTENED ANTI-OXIDATION AND INSULATING LAYERS

This patent application is a divisional of application Ser. No. 08/814,318, filed Mar. 11, 1997.

FIELD OF THE INVENTION AND RELATED ART

The present invention relates to an electrode plate, particularly an electrode plate provided with a specific metal electrode and a transparent electrode formed thereon and a production process of the electrode plate. The present invention also relates to a liquid crystal device including the electrode plate and a production process thereof.

In light-transmissive substrates of twisted nematic (TN)-type or super twisted nematic (STN)-type, there have generally been conventionally used ITO (indium tin oxide) films as transparent electrodes. However such ITO films constituting the transparent electrodes have a fairly high resistivity, so that they have caused a problem of a voltage waveform deformation (or distortion) due to electrical signal delay along with increases in size and resolution of a display area in recent years. Particularly, in liquid crystal devices using a ferroelectric liquid crystal, this problem has become more noticeable since such devices have included a cell structure having a smaller cell gap (e.g., 1–3 $\mu$m).

In order to solve the problem, it may be possible to increase the thickness of the transparent electrodes, but the formation of such thick transparent electrodes requires increased time and cost and results in a lower transparency of the electrodes.

In order to solve the above-mentioned problems, it has been proposed an electrode plate having structure in which a plurality of metal electrodes showing a low resistivity are formed along a plurality of transparent electrodes of a small thickness (as disclosed in Japanese Laid-Open Patent Application (JP-A 2-63019). The electrode plate includes metal electrodes embedded with a transparent insulating material so as to expose the metal pattern and transparent electrodes of, e.g., ITO film formed on the metal electrodes.

In producing an electrode plate having a structure as described above, it has been also proposed to use a transparent resin as the insulating material filling the gaps between the metal electrodes (JP-A 6-347810) as illustrated in FIGS. 20 and 21.

According to the proposed process, as shown in FIG. 20A, on a transparent smooth (or smoothening) mold substrate (hereinafter called "smooth plate") 101, a prescribed amount of a liquid resin of ultraviolet (UV)-curable resin 102 is placed dropwise by using a metering device of a dispenser (not shown). Then, as shown in FIG. 20B, a glass substrate 104 already provided with a pattern of ca. 1 $\mu$m-thick metal electrodes 103 is placed on the smooth plate having thereon the UV-curable resin 102. The metal electrodes 103 may be formed on the glass substrate 104 by forming a metal film of, e.g., Cu (copper) through, e.g., sputtering and then effecting patterning of the metal film through a photolithographic process.

Then, as shown in FIG. 21A, the above-formed integrated structure (including the smooth plate 101, the UV-curable resin 102, the metal electrodes 103 and the glass substrate 104) is incorporated in a press (pressing machine) 105, followed by pressing thereof with the press 105 so as to ensure an intimate contact over the entire area between the smooth plate 101 and the glass substrate 104. At this time, the smooth plate 101 and the glass substrate 104 are strongly and uniformly pressed by the press 105 so as to remove at least a portion of the UV-curable resin 102 present at the surface of the metal electrodes 103, thus ensuring an electrical connection of the metal electrodes 103 with associated transparent electrodes of, e.g., ITO film formed in a later step by the contact therebetween.

Thereafter, the integrated structure is taken out from the press 105 and irradiated with UV rays 106 falling on the smooth plate 101 to cure the UV-curable resin 102 (FIG. 21B), and then peeled or removed from the smooth plate 101 by a peeling device or mechanism (not shown) (FIGS. 21C and 21D).

Further, transparent electrodes 107 of ITO film are formed over the metal electrodes 103 and the UV-cured resin 102 filling the spacings between the metal electrodes 103 so as to be electrically connected with the metal electrodes 103, thus preparing an electrode plate 100 embedding the metal electrodes 103 with the UV-cured resin 102 (FIG. 21E).

The thus-prepared electrode plate 100 through the above-described conventional process may preferably include metal electrodes of Cu having a considerably low resistance of $2 \times 10^{-8}$–$10 \times 10^{-8}$ ohm.m. Such Cu-made metal electrodes have the advantages of a thin film thickness and inexpensive material cost, thus resulting in a most economical metal material.

In the case of using Cu as the material for metal electrodes 103, however, the resultant metal electrodes 103 of Cu have a low adhesive force to the glass substrate 104, so that a portion or all of the metal electrodes 13 are liable to be peeled or detached from the glass substrate 104 (i.e., remain on the smooth plate 101) when the smooth plate 101 is removed from the above-mentioned integrated structure (consisting of the structural members 101–104) in the peeling step as shown in FIGS. 21C and 21D. As a result, a yield of production of the electrode plate 100 is remarkably decreased in such a case.

Further, Cu constituting the metal electrodes 103 is a metal susceptible to oxidation, so that the resultant metal electrodes 103 are liable to fail to obtain a stable electrical connection with (or electrical conduction to) the transparent electrodes formed thereon due to surface oxidation of Cu in the step as shown in FIG. 21E.

Further, in the above-described process for producing the electrode plate 100, the metal electrodes 103 directly contacts the UV-curable resin 102 in the steps as shown in FIGS. 21A and 21B, thus being exposed to various solvents within and gaseous components generated by the UV-curable resin 102.

With respect to this problem, when metal electrodes of a metal, such as Al (aluminum), capable of forming a strong passivation layer is used, the resultant metal electrodes are little accompanied with the problem in some cases. However, in order to obviate the voltage waveform distortion, in the case of using Cu having a lower resistivity than Al as the material for the metal electrodes 103, the resultant metal electrodes 103 of Cu are exposed to the above-mentioned solvents and gaseous components to cause corrosion due to oxidation thereof since Cu does not form a passivation layer.

SUMMARY OF THE INVENTION

In view of the above-mentioned problems, a principal object of the present invention is to provide an electrode plate capable of improving adhesive properties (adhesiveness) between metal electrodes and a substrate having thereon the metal electrodes and providing a stable electrical conduction of the metal electrodes to transparent electrodes formed thereon, and a high-quality liquid crystal device including such an electrode plate.

Another object of the present invention is to provide processes for producing an electrode plate and a liquid crystal device as described above.

According to the present invention, there is provided an electrode plate, comprising: at least a light-transmissive substrate, a plurality of metal electrodes disposed on the light-transmission substrate and with spacings therebetween, and an insulating layer disposed at the spacings; wherein each of the metal electrodes includes a first layer comprising a metal or alloy selected from the group consisting of titanium, chronium, molybdenum, tungsten, aluminum, tantalum and nickel, and a second layer comprising copper or silver disposed on the first layer.

According to the present invention, there is also provided an electrode plate, comprising: at least a light-transmissive substrate, a plurality of metal electrodes disposed on the light-transmissive substrate and with spacings therebetween, and an insulating layer disposed at the spacings; wherein each of the metal electrodes includes a first layer comprising a metal or alloy selected from the group consisting of titanium, chronium, molybdenum, tungsten, aluminum, tantalum and nickel, a second layer comprising copper or silver dispersed on the first layer, and a third layer comprising a metal or alloy selected from the group consisting of molybdenum, tantalum, tungsten, titanium, chromium, nickel and zinc and disposed on the second layer.

According to the present invention, there is further provided an electrode plate, comprising: at least a light-transmissive substrate, a plurality of metal electrodes disposed on the light-transmissive substrate and with spacings therebetween, and an insulating layer disposed at the spacings; wherein each of the metal electrodes includes a first layer comprising copper or silver, and a second layer comprising a metal or alloy selected from the group consisting of molybdenum, tantalum, tungsten, titanium, chromium, nickel and zinc and disposed on the first layer.

According to another aspect of the present invention, there is provided a liquid crystal device, comprising: a pair of electrode plates and a liquid crystal disposed between the electrode plates; at least one of the pair of electrode plates comprising at least a light-transmissive substrate, a plurality of metal electrodes disposed on the light-transmissive substrate and with spacings therebetween, and an insulating layer disposed at the spacings; wherein each of the metal electrodes includes a first layer comprising a metal or alloy selected from the group consisting of titanium, chronium, molybdenum, tungsten, aluminum, tantalum and nickel, and a second layer comprising copper or silver disposed on the first layer.

According to another aspect of the present invention, there is also provided a liquid crystal device, comprising: a pair of electrode plates and a liquid crystal disposed between the electrode plates; at least one of the pair of electrode plates comprising at least a light-transmissive substrate, a plurality of metal electrodes disposed on the light-transmissive substrate and with spacings therebetween, and an insulating layer disposed at the spacings; wherein each of the metal electrodes includes a first layer comprising a metal or alloy selected from the group consisting of titanium, chronium, molybdenum, tungsten, aluminum, tantalum and nickel, a second layer comprising copper or silver dispersed on the first layer, and the third layer comprising a metal or alloy selected from the group consisting of molybdenum, tantalum, tungsten, titanium, chromium, nickel, and zinc and disposed on the second layer.

According to another aspect of the present invention, there is further provided a liquid crystal device, comprising: a pair of electrode plates and a liquid crystal disposed between the electrode plates; at least one of the pair of electrode plates comprising at least a light-transmissive substrate, a plurality of metal electrodes disposed on the light-transmissive substrate and with spacings therebetween, and an insulating layer disposed at the spacings; wherein each of the metal electrodes includes a layer comprising copper or silver, and a second layer comprising a metal or alloy selected from the group consisting of molybdenum, tantalum, tungsten, titanium, chromium, nickel and zinc and disposed on the first layer.

According to a further aspect of the present invention, there is provided a process for producing an electrode plate comprising at least a light-transmissive substrate, a plurality of metal electrodes, each including a first layer and a second layer, disposed on the light-transmissive substrate and with spacings therebetween, and an insulating layer disposed at the spacings; the process comprising the steps of:

forming on the light-transmissive substrate a first layer comprising a metal or alloy selected from the group consisting of titanium, chronium, molybdenum, tungsten, aluminum, tantalum and nickel, and forming a second layer comprising copper or silver disposed on the first layer.

This process may preferably further comprise a step of forming on the second layer a third layer, constituting each of the metal electrodes, comprising a metal or alloy selected from the group consisting of molybdenum, tantalum, tungsten, titanium, chromium, nickel, aluminum and zinc.

According to a further aspect of the present invention, there is provided a process for producing an electrode plate, comprising at least a light-transmissive substrate, a plurality of metal electrodes, each including first layer and a second layer, disposed on the light-transmissive substrate and with spacings therebetween, and an insulating layer disposed at the spacings; the process comprising the steps of:

forming on the light-transmissive substrate a first layer comprising copper or silver, and forming on the first layer a second layer comprising a metal or alloy selected from the group consisting of molybdenum, tantalum, tungsten, titanium, chromium, nickel, aluminum and zinc.

According to a still further aspect of the present invention, there is provided a process for producing a liquid crystal device, comprising the steps of:

forming a pair of electrode plates each produced by any one of processes as described above, disposing the electrode plate opposite to each other while leaving a gap therebetween, and filling the gap with a liquid crystal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
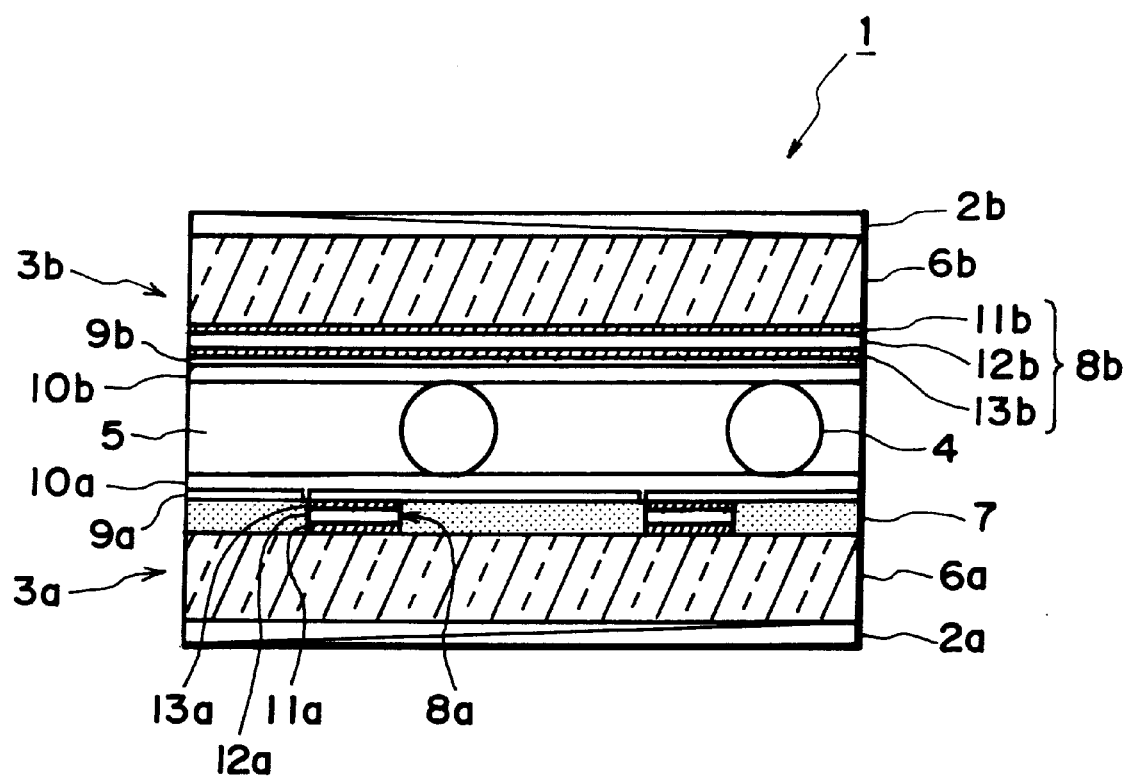
FIG. 1 is a schematic sectional view of a liquid crystal device including an electrode plate according to First embodiment (appearing hereinafter) in the present invention.

Hereinbelow, preferred embodiments of the present invention will be described with reference to FIGS. 1–19. In these figures, identical reference numerals are used for describing identical structural members or materials, unless otherwise noted.

First Embodiment

FIG. 1 shows a liquid crystal device prepared in this embodiment.

Referring to FIG. 1, a liquid crystal device 1 includes a pair of oppositely disposed electrode plates 3a and 3b outside which a pair of polarizers 2a and 2b are disposed. The electrode plates 3a and 3b are disposed with a prescribed gap (e.g., 1.5 µm) controlled by uniform spacer beads 4, in which a chiral smectic liquid crystal 5 exhibiting ferroelectricity is filled and then sealed up with a sealing agent (not shown). The chiral smectic liquid crystal may preferably be formulated a a liquid crystal composition comprising a phenyl pyrimidine-based mesomorphic (or liquid crystal) compound and an optically active compound.

Each electrode plate 3a (or 3b) includes glass substrate 6a (or 6b) as a light-transmissive substrate; an UV-cured resin layer 7a (or 7b) as insulating layer disposed on the glass substrate 6a (or 6b); stripe-shaped metal electrodes 8a (or 8b) comprising first to third (three) layers 11a, 12a and 13a and disposed on the glass substrate with spacings between which the UV-curable resin layer 7a (or 7b) is disposed; stripe-shaped transparent electrodes of ITO (indium tin oxide) 9a (or 9b) disposed on the metal electrodes 8a (or 8b) and the UV-curable resin 7a (or 7b) layer and each electrically connected with an associated metal electrode 8a (or 8b); and an alignment control layer 10a (or 10b) disposed on the transparent electrodes 9a (or 9b). The alignment control layers 10a and 10b may be made of materials identical to or different from each other and generally made of a film of polyimide, polyamide, polysiloxane or silane coupling agent. At least one of the alignment control layers 10a and 10b may preferably be subjected to uniaxial aligning treatment, such as rubbing.

The stripe-shaped transparent electrodes 9a partially in alignment with the stripe-shaped metal electrodes 8a intersect with the stripe-shaped transparent electrodes 9b partially in alignment with the stripe-shaped metal electrodes 8b to form a matrix electrode structure including pixels each at an intersection of the transparent electrodes 9a and 9b.

Each of the glass substrates 6a and 6b has a thickness of, e.g., 0.5–2.0 mm and may be made of a material, such as soda glass (blue plate glass) or borosilicate glass (e.g., "#7059" (free of alkali) available from Corning Co.). The glass substrates 6a (6b) may preferably have a high flatness or smoothness through polishing thereof on both sides. It is possible to use a transparent plastic substrate instead of the glass substrate.

The UV-cured resin layer 7a (or 7b) may be formed through polymerization of a mixture of a polymerization initiator and a monomer or oligomer for an UV-curable resin of acrylic-type, epoxy-type or ene-thiol type (having a double bond and an SH group) but is required to have sufficient resistances to heat, chemicals and washings in, e.g., a sputtering step of ITO film and a hot-curing step of an alignment control film in electrode plate production. For example, the UV-curable resin may preferably comprise a reactive oligomer (as a main component) into which a heat-resistant molecular structure is introduced or which is increased in degree of crosslinking by polyfunctional monomers. The UV-curable resin is cured by irradiation with UV rays to form the UV-cured resin layer 7a (or 7b). In the present invention, it is also possible to use other curable resins, such as photocurable resins cured by irradiation with visible rays or infrared rays and thermosetting resins.

However, the UV-cured resin may particularly preferably be used in view of productivity. The UV-cured resin layer 7a (or 7b) forms a substantially smooth (even) surface together with the metal electrodes 8a (or 8b).

The metal electrodes 8a and 8b respectively have a lamination structure of three layers including a first layer (undercoat or primer layer) 11a (or 11b) formed on the glass substrate 6a (or 6b), a second layer (low-resistance metal layer) 12a (or 12b) formed on the first layer 11a (or 11b), and a third layer (protective layer) 13a (or 13b) formed on the second layer 12a (or 12b).

More specifically, the undercoat layer 11a (or 11b) may preferably be a 0.01–0.3 µm thick film of a metal or alloy having a good adhesiveness (adhesive properties) to the glass substrate 6a (6b). Examples of such a metal or alloy include a single metal, such as Ti (titanium), Cr (chromium), Mo (molybdenum), W (tungsten), Al (aluminum), Ta (tantalum), Ni (nickel); and alloys of these metals.

The low-resistance metal layer 12a (12b) may preferably be a 0.5–3 µm thick film of Cu (copper) or Ag (silver), particularly preferably Cu.

The protective layer 13a (13b) functioning as an anti-oxidizing film may preferably be a 0.01–0.3 µm thick film of a metal or alloy having a high melting point. Examples of such a metal or alloy include a single metal, such as Mo, Ta, W, Ti, Cr, Ni (nickel), Al and Zn (zinc), and alloys of these metals.

Hereinbelow, a process for producing the above-mentioned electrode plate 1 of this embodiment will be specifically described with reference to FIGS. 2–4.

PRODUCTION EXAMPLE 1

Figure 2A:
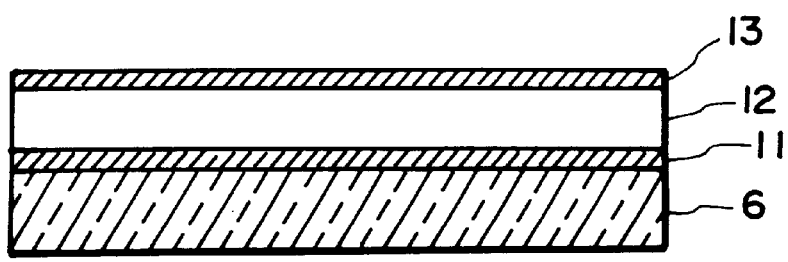
FIGS. 2A–2D and 3A–3D are schematic sectional views for illustrating a series of steps generally involved in a process for producing the electrode plate according to First embodiment.

First, referring to FIG. 2A, a 1.1 mm-thick (transparent) glass substrate 6 (size=300×310 mm, double-side polished) was coated with a 500 Å-thick Mo (undercoat) layer 11 by sputtering under the following conditions.

Power (W/cm$^2$): 3.5

Pressure (Pa): 0.6

Gas: Ar

Substrate temperature (° C.): 200

On the undercoat layer 11, a 1 µm-thick Cu (low-resistance) metal layer 12 was formed by sputtering under conditions identical to those for forming the undercoat layer 11 except for changing the target of Mo to a target of Cu.

On the low-resistance metal layer 12, a 500 Å-thick Ta (protective) layer 13 was formed by sputtering under conditions identical to those for forming the undercoat layer 11 except for changing the target of Mo to a target of Ta, thus preparing a metal electrode layer formed on the glass substrate 6 (FIG. 2A).

Then, a 2 µm-thick layer of a photoresist (not shown) was applied to the entire surface of the protective layer 13 by spin coating and pre-baked, followed by exposure to light at an energy of 80 mmJ/cm$^2$ by using an exposure apparatus ("MPA-1500", mfd. by Canon K.K.) with a mask having a prescribed pattern (not shown). After development and post-baking, a thus-treated metal electrode layer 8 having thereon a photoresist pattern (not shown) was subjected to etching with an etchant, followed by peeling of the photoresist pattern to form on the glass substrate 6 stripe-shaped metal electrodes 8 each having a width of 20 µm and at a pitch of 320 µm and each consisting of the undercoat layer 11, the low-resistance layer 12 and the protective layer 13 (FIG. 2B).

Figure 2B:
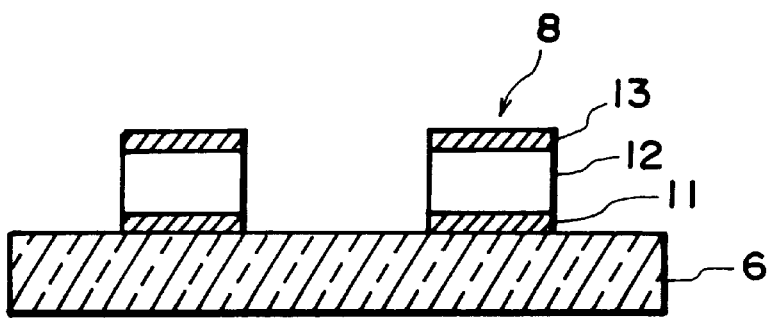
Figure 2C:
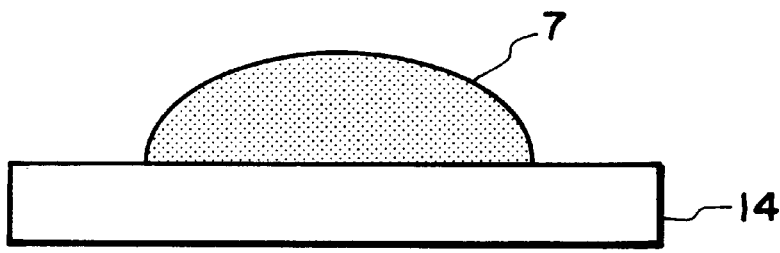

Then, on a glass-made smooth plate 14, an acrylic UV-curable resin 7 comprising a mixture of pentaerithritol triacrylate/neopentyl glycol diacrylate/1-hydroycyclohexyl phenyl ketone (50/50/2 by weight) was placed dropwise in an appropriate amount by using a dispenser (not shown) (FIG. 2C).

The above-prepared glass substrate 6 provided with the patterned metal electrodes 8 (as shown in FIG. 2B) was applied to contact the smooth plate 14 so as to sandwich the UV-curable resin 7 therebetween via the metal electrodes 8 (FIG. 2D) to prepare an integrated structure.

Figure 2D:
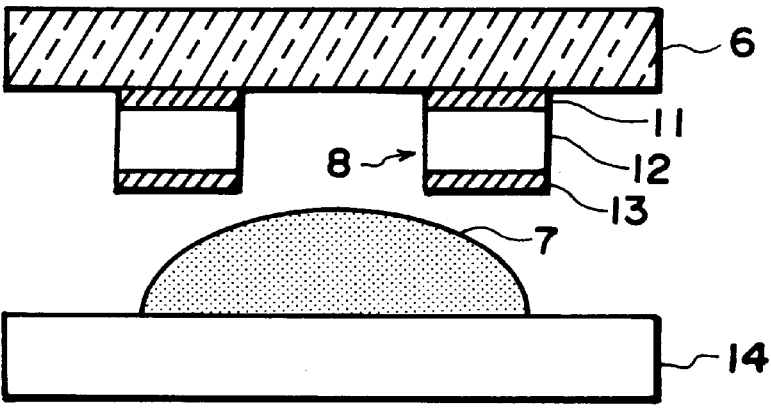

Incidentally, the above steps (as shown in FIGS. 2C and 2D) for forming the integrated structure may be performed by placing the UV-curable resin 7 on the glass substrate 6 and applying the resultant glass substrate 6 to the smooth plate 14.

Figure 3A:
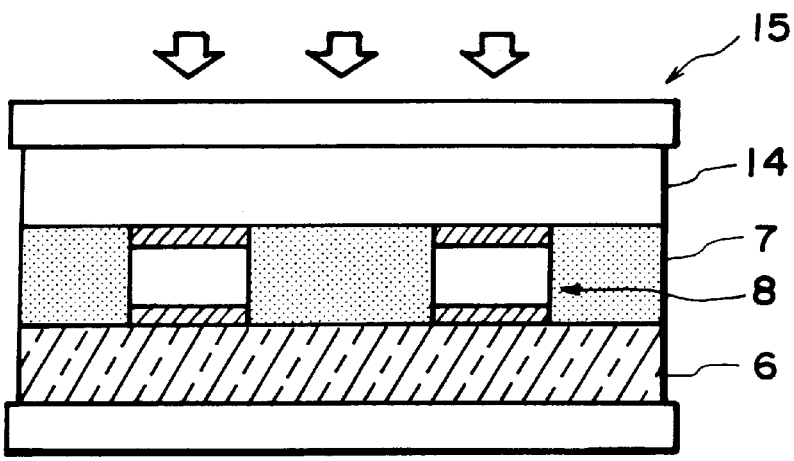

The integrated structure (of the structural members 6, 7, 8 and 14) was supplied with a pressure of 3 ton (as press pressure for 1 min.) by using a press 15 to cause an intimate contact over the entire area of the integrated structure (FIG. 3A). At this time, the smooth plate 14 and the glass substrate 6 were strongly and uniformly pressed by the press 15 so as to remove at least a portion of the UV-curable resin 7 from the surface of the metal electrodes 8 to ensure an electrical connection of the metal electrodes 8 with transparent electrodes of ITO formed in a later step by the contact therebetween.

Figure 3B:
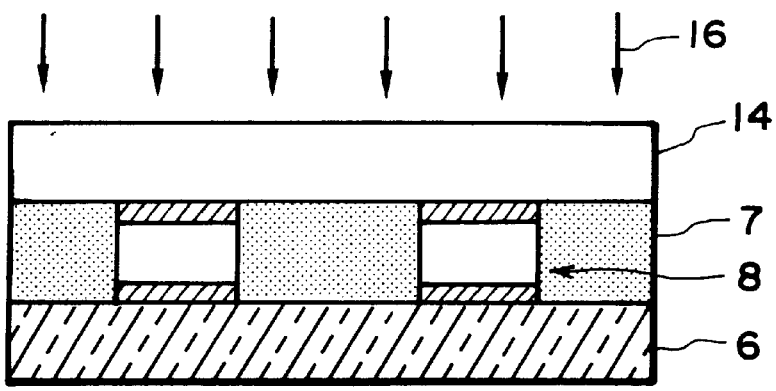

After about 10 min., the integrated structure was taken out from the press 15 was irradiated with UV rays (issued from four 100 W—high pressure mercury lamps disposed outside the smooth plate 14) 16 to cure the UV-curable resin 7 (FIG. 3B).

In this step, as the press 15, a roller press was used. In the present invention, it is possible to adopt a press using an oil-pressure cylinder or an air cylinder. Further, when the press 15 is used, a viscosity of the UV-curable resin 7 is decreased by heating with a heater or heated liquid to effectively extend a region of the UV-curable resin 7.

Figure 3C:
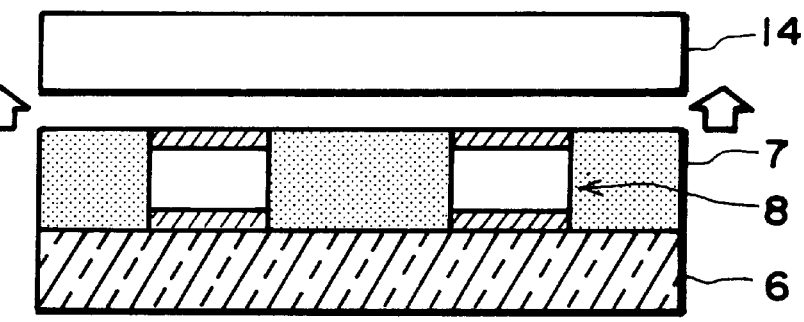
Figure 3D:
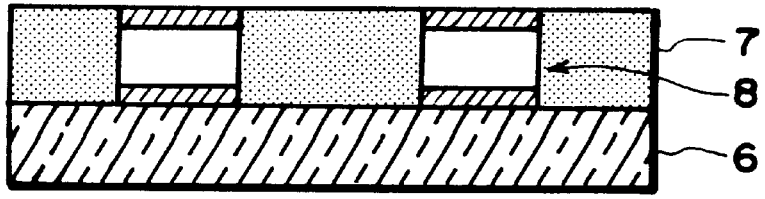

Then, the integrated structure excluding the smooth plate 14 was removed from the smooth palte 14 by using a peeling mechanism (not shown) (FIGS. 3C and 3D).

Figure 4:
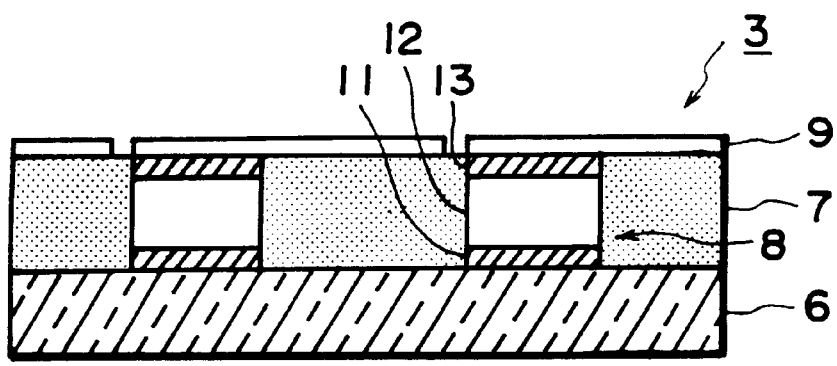
FIG. 4 is a schematic sectional view of the electrode plate of First embodiment prepared by the process shown in FIGS. 2A–3D and further provided with transparent electrodes.

On the smooth surface of the metal electrodes 8 and the UV-cured resin 7, 30 µm-wide transparent electrodes 9 of ITO were formed by sputtering and patterning so as to be partially in alignment with the associated metal electrodes 8 to ensure an electrical conduction therebetween (FIG. 4).

Thereafter, a polyimide alignment control film (not shown) was formed on the transparent electrodes 9 to prepare an electrode plate 3 (corresponding to the electrode plate 3a or 3b of the liquid crystal device 1 shown in FIG. 1).

The thus-prepared pair of electrode plates 3 was disposed opposite to each other while leaving a gap of 1.5 µm, which was then filled with a chiral smectic liquid crystal to obtain a liquid crystal device 1 as shown in FIG. 1.

According to this embodiment, each metal electrode 8 comprises the undercoat layer 11, the low-resistance metal layer 12 and the protective layer 13.

Based on this lamination structure, no peeling of the metal electrodes 8 of the liquid crystal device 1 from the glass substrate 6 was observed due to a good adhesiveness of the undercoat layer 11 of Mo to the glass substrate 6 in the peeling step shown in FIGS. 3C and 3D. Further, the use of the protective layer 13 of Ta, functioning as an anti-oxidizing layer, formed on the low-resistance metal layer 12 of Cu allowed a stable electrical conduction therebetween by suppressing oxidation of the metal layer 12 of Cu.

Accordingly, the liquid crystal device 1 employing such advantageous metal electrodes 8a and 8b as shown in FIG.

1 can effect high-quality display due to prevention of peeling of the metal electrodes 8a and 8b from the glass substrates 6a and 6b, respectively, and stable electrical connections between the metal electrodes 8a and the transparent electrodes 9a and between the metal electrodes 8b and the transparent electrodes 9b.

Further, it is possible to minimize or suppress voltage waveform distortion due to signal delay since the liquid crystal device 1 uses the metal electrodes 8a and 8b, including the low-resistance metal layers 12a and 12b of Cu, disposed directly under the associated transparent electrodes 9a and 9b even in the case of using a ferroelectric liquid crystal.

Further, the use of the metal electrodes 8a and 8b allow thin transparent electrodes 9a and 9b, thus maintaining a high transmittance of the transparent electrodes 9a and 9b while enhancing an electrical conductivity. As a result, the transparent electrodes are not visually recognized.

For comparison with this embodiment, an electrode plate was prepared in the same manner as above except that the protective layer 13 of Ta constituting the metal electrodes 8 was changed to that of Al. The resultant electrode plate caused conduction failure between the metal electrodes 8 and the transparent electrodes 9. This is presumably because the layer of Al is oxidized to form a passivation layer of $Al_2O_3$ at the surface of the metal electrodes 8.

In this embodiment, it may be possible to use Au and Pt (platinum), being not oxidized, as the protective layer 13. However, it is difficult to ensure a close contact of Au with the lower layer 12 of Cu. Further, the use of Au and Pt complicates the etching step since a particular etchant must be used at the time of patterning, thus resulting in an insufficient etching step.

Further, if Cr is used as a material for the undercoat layer 11 and/or the protective layer 13, a particular equipment is required to effect waste liquid disposal after patterning thereof since the etching waste liquid of Cr is toxic or poisonous, thus resulting in a high production cost.

Accordingly, a material suitable for the undercoat layer 11 is a metal or alloy selected from the group consisting of Mo, Ti, W, Al, Ta and Ni. On the other hand, a material suitable for the protective layer 13 is a metal or alloy selected from the group consisting of Ta, Mo, W, Ti, Ni and Zn.

Second Embodiment

Figure 5A:
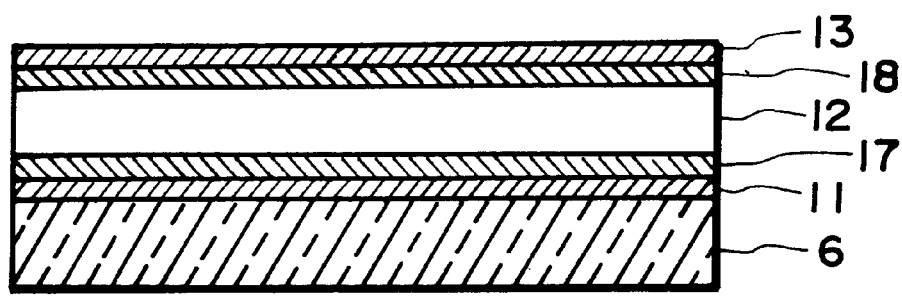
FIGS. 5A and 5B and FIGS. 6A and 6B are respectively schematic sectional views for illustrating a process for producing an electrode plate according to Second and Third embodiments in the present invention, including FIGS. 5A and 6A which show a step of forming a metal electrode layer and FIGS. 5B and 6B which show a resultant electrode plate including metal electrodes.
Figure 5B:
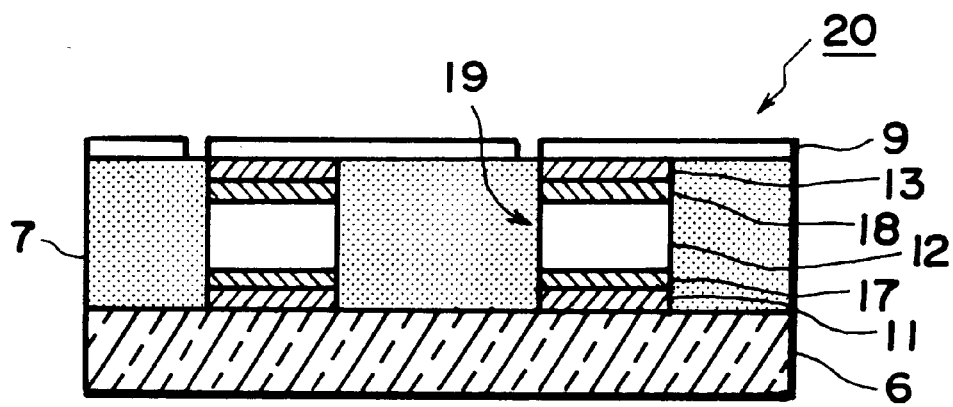

FIGS. 5A and 5B respectively illustrate an electrode plate used in this embodiment.

In this embodiment, as shown in FIG. 5B, an electrode plate 20 has a lamination structure for each metal electrode 19 identical to that of the electrode plate 3 in Production Example 1 except for further including a first mixing layer 17 comprising materials for an undercoat layer 11 and a low-resistance metal layer 12 and a second mixing layer 18 comprising materials for the metal layer 12 and a protective layer 13.

PRODUCTION EXAMPLE 2

Similarly as in Production Example 1, as shown in FIG. 5A, a 500 Å-thick undercoat layer 11 of Mo was formed on a 1.1 mm-thick glass substrate 6. On the undercoat layer 11, a 500 Å-thick first mixing layer 17 of Mo and Cu was formed by co-sputtering (simultaneous sputtering) with Mo and Cu under conditions identical to those for forming the undercoat layer 11 in Production Example 1 except for changing the target of Mo to two targets of Mo and Cu.

Thereafter, a 1 μm-thick low-resistance metal layer 12 was formed on the first mixing layer 17 in the same manner as in Production Example 1.

On the metal layer 12, a 500 Å-thick second mixing layer 18 of Cu and Ta was formed by co-sputtering with Cu and Ta in the same manner as in the first mixing layer 17, and thereon a 500 Å-thick protective layer 13 was formed similarly as in Production Example 1.

Thereafter, an electrode plate 20 was prepared in the same manner as in First embodiment by using the above glass substrate 6 having thereon a metal electrode layer including the five layers 11, 17 12, 18 and 13 (FIG. 5B).

According to this embodiment, it was possible to attain the above-described effects similarly as in Production Example 1. In addition, in this embodiment, adhesivenesses at boundaries between the undercoat layer 11 and the low-resistance metal layer 12 and between the metal layer 12 and the protective layer 13 were further enhanced by forming the first and second mixing layers 17 and 18, respectively.

In this regard, in the peeling step of the treated glass substrate 6, no peeling at the above boundaries was confirmed at all.

Third Embodiment

Figure 6A:
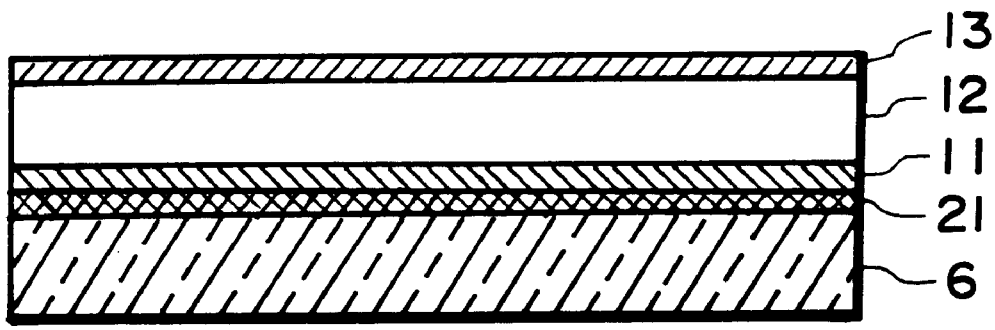
Figure 6B:
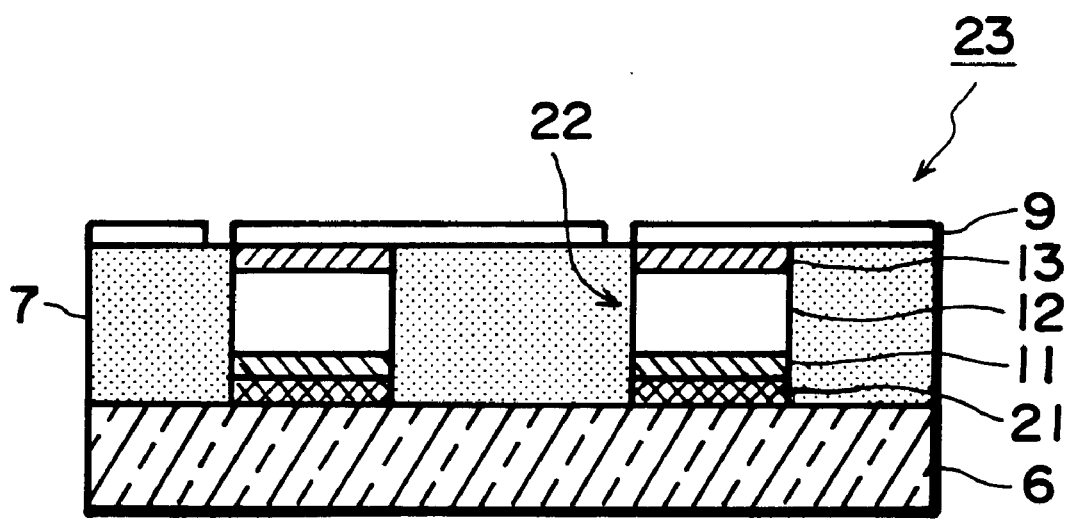

FIGS. 6A and 6B respectively illustrate an electrode plate used in this embodiment.

In this embodiment, as shown in FIG. 6B, an electrode plate 23 has a lamination structure for each metal electrode 22 identical to that of the electrode plate 3 in Production Example 1 except that a layer 21 of a metal oxide having decreased oxygen content (herein, simply referred to as "metal oxide layer") is disposed between a glass substrate 6 and an undercoat layer 11.

The metal oxide layer 21 comprises a metal oxide represented by the formula: MOx wherein M represents a single metal or an alloy selected from the group consisting of Mo, Ti, Ta, Ni and W, and x satisfies the following relationship: $0<x<n/2$ when n is a valence (or valency) of M.

PRODUCTION EXAMPLE 3

An electrode plate 23 was prepared in the same manner as in Production Example 1 except for forming a metal oxide layer 21 in the following manner.

A 500 Å-thick metal oxide layer 21 of MoOx was formed on a 1.1 mm-thick glass substrate 6 by reactive sputtering with a mixture gas of Ar and $O_2$ (Ar:$O_2$=100:5) in a plasma state.

When a reflectance at a boundary between the metal oxide layer 21 and the glass substrate 6 was measured by using incident light from the glass substrate side, a reflectance of at most 10% was obtained to remarkably reduce a degree of reflection of external light.

According to this embodiment, a liquid crystal device using the above-prepared electrode plate 23 brought about not only the above-mentioned effects similarly as in First embodiment but also provided a further improved display quality by the effect of reducing an external light reflection due to the above-formed metal oxide layer 21.

Fourth Embodiment

Figure 7A:
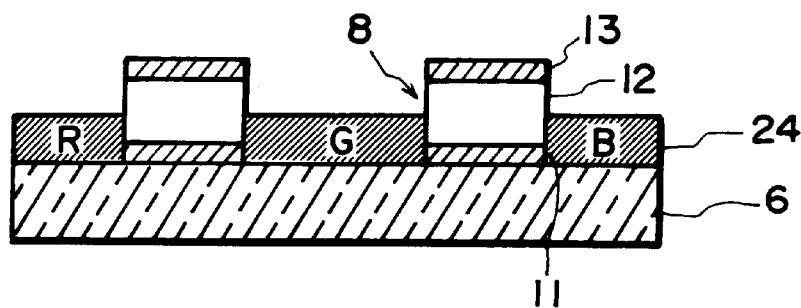
FIGS. 7A–7C, FIGS. 8A–8C and FIGS. 9A–9C are respectively schematic sectional views for illustrating a process for producing an electrode plate provided with a color filter layer according to Fourth to Sixth embodiments in the present invention.
Figure 7B:
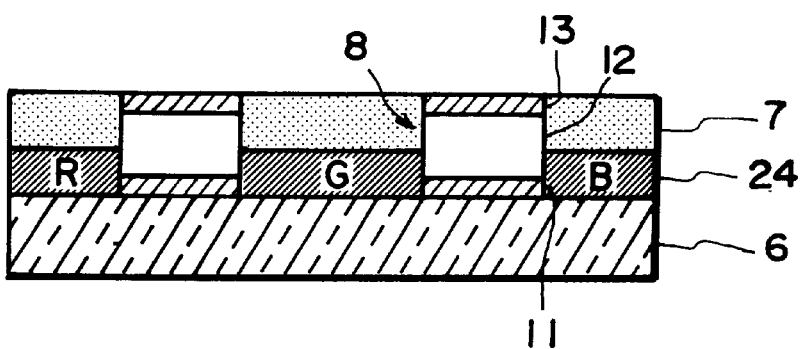
Figure 7C:
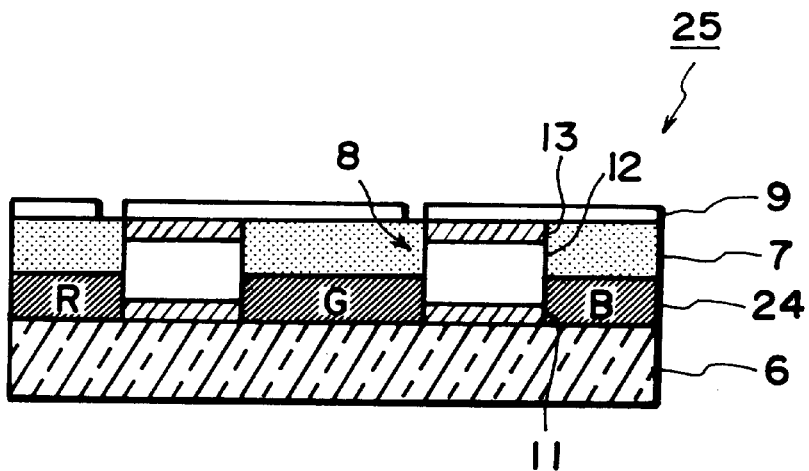

FIGS. 7A–7C are schematic views for illustrating a series of steps generally involved in a process for producing an electrode plate.

In this embodiment, as shown in FIG. 7C, an electrode plate 25 includes a color filter layer 24 comprising stripe-shaped three color filter segments of red (R), green (G) and blue (B) each containing pigments or dyes, disposed between metal electrodes 8 and between a UV-cured layer 7 and a glass substrate 6, otherwise similarly as in First embodiment.

PRODUCTION EXAMPLE 4

An electrode plate 25 was prepared in the same manner as in Production Example 1 except that a ca. 1 μm-thick pigment-type color filter layer 24 comprising segments of R, G and B was further formed at spacings between metal electrodes 8 for each color filter segment (R, G, B) through a photolithographic process including patterning and etching steps.

Then, a liquid crystal device was prepared in the same manner as in Production Example 1 by using the thus-formed two electrode plates 25, whereby a good color display quality was attained while maintaining the effects described in Production Example 1.

In this embodiment, the color filter layer 24 may be formed by using a wet-coating method, a sublimation transfer method and an ink jet method.

Further, the color filter 24 used in this embodiment may be adopted in Second and Third embodiments.

Fifth Embodiment

Figure 8A:
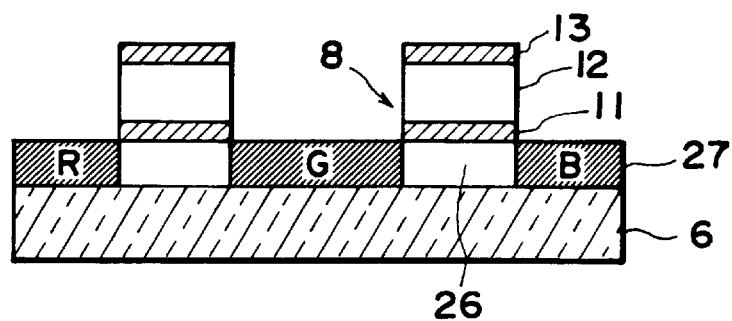
Figure 8B:
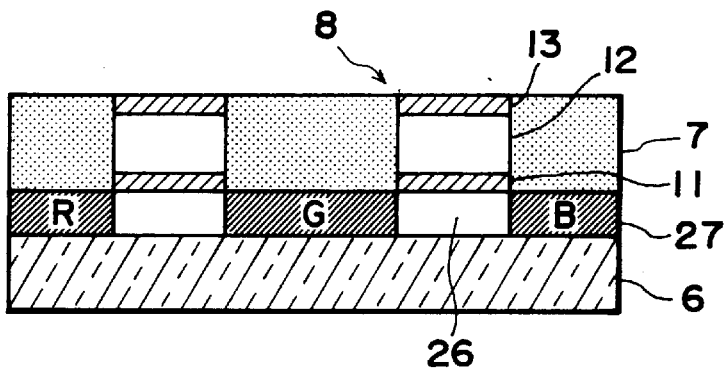
Figure 8C:
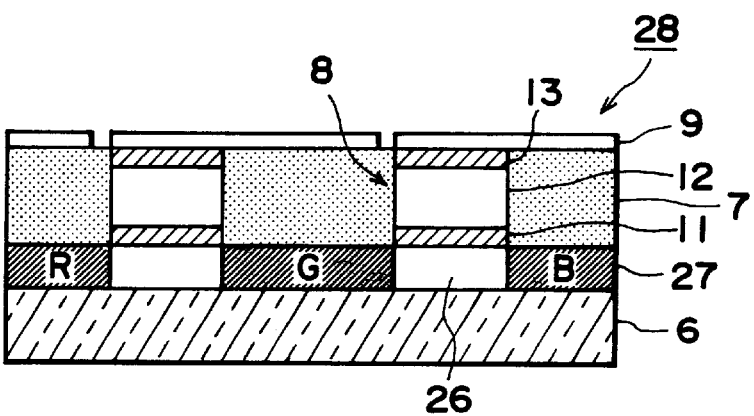

FIGS. 8A–8C are schematic views for illustrating a series of steps generally involved in a process for producing an electrode plate.

In this embodiment, as shown in FIG. 8C, an electrode plate 28 includes an ink-receptive layer 26, disposed directly on a glass substrate 6, in which a color filter 27 comprising color filter segments of R, G and B is partially formed.

PRODUCTION EXAMPLE 5

An electrode plate 28 was prepared in the same manner as in Production Example 1 except that a transparent ink-receptive layer 26 partially containing a color filter 27 was further formed in the following manner.

A 0.8 μm-thick ink-receptive layer 26 was formed on a 1.1 mm-thick glass substrate 6 by spin coating using a hydrophilic acrylic polymer. Then, into the ink-receptive layer 26, water-soluble dye-based inks for three color filter segments of R, G and B were injected, respectively, so as to have a width of 300 μm at a pitch of 320 μm by using an ink jet printer for a color filter (not shown), followed by hot-curing at 200° C. for 30 min. to form a color filter 7 of three colors (R, G and B), thus providing a color filter layer partially containing a transparent portion (e.g., 26 in FIG. 8A).

According to this embodiment, it was also possible to attain the similar effects as in Fourth embodiment described above.

Sixth Embodiment

Figure 9A:
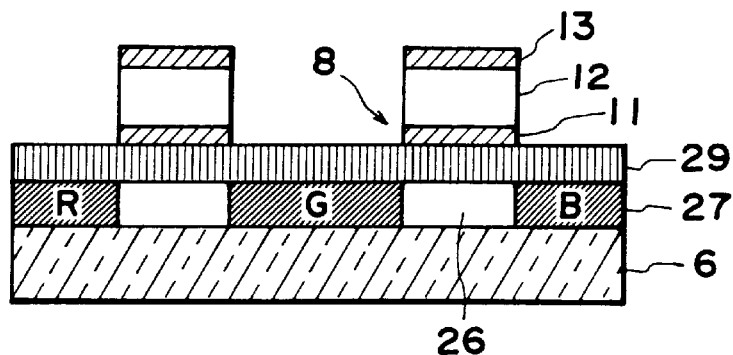
Figure 9B:
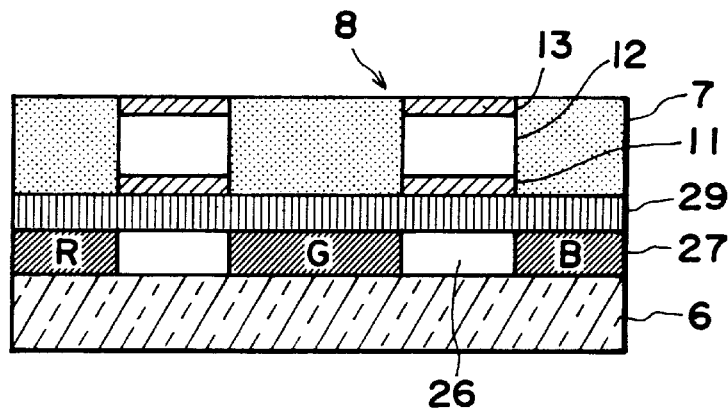
Figure 9C:
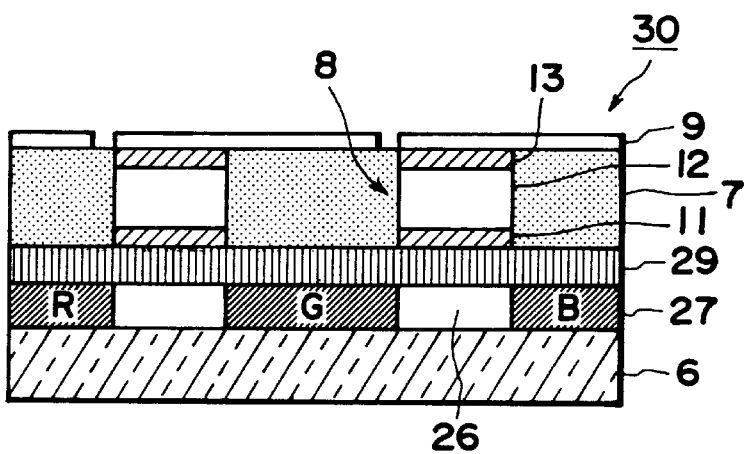

FIGS. 9A–9C are schematic views for illustrating a series of steps generally involved in a process for producing an electrode plate.

In this embodiment, as shown in FIG. 9C, an electrode plate 30 includes a color filter-protective layer 29 formed directly on an ink-receptive layer 26 containing a color filter 27.

PRODUCTION EXAMPLE 6

An electrode plate 30 was prepared in the same manner as in Production Example 5 except that a 0.5 μm-thick color filter-protective layer 29 was formed on an ink-receptive layer 26 (and on a color filter 27) by spin coating using a transparent coating agent of polyamide-type, followed by baking.

The thus-prepared electrode plate 30 provided better performances similarly as in Fourth and Fifth embodiments. Further, it was also possible to prevent decoloring of the color filter 27 by an acid-based etchant used in the step of forming the metal electrodes 8, thus realizing good color display.

In the present invention, the color filter layer containing a transparent portion (26 and 27) formed in Fifth embodiment and the combination of such a color filter layer and the color filter-protective layer 29 used in Sixth embodiment may be respectively applicable to the above-mentioned Second and Third embodiments.

Hereinbelow, electrode plates used in seventh to ninth embodiments of the present invention wherein each of metal electrodes includes an undercoat layer, a low-resistance metal layer formed on the undercoat layer and a protective layer formed so as to coat an entire exposed surface of the undercoat layer and the metal layer will be described with reference to FIGS. 10–14.

Figure 10:
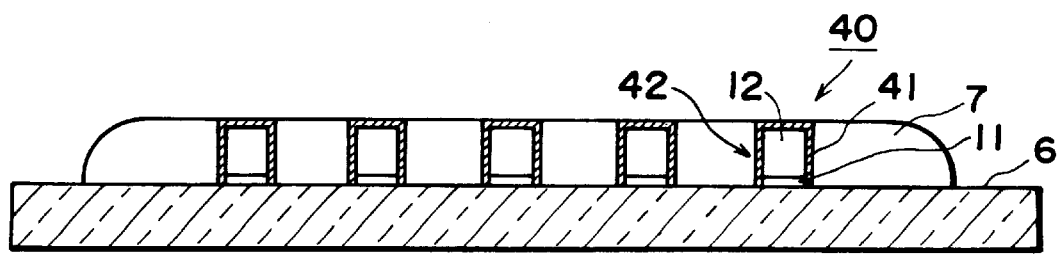
FIG. 10 is a schematic sectional view of an electrode plate according to Seventh to Ninth embodiments in the present invention.

Referring to FIG. 10, an electrode plate 40 includes a glass substrate 6, metal electrodes 42 disposed on the glass substrate 6 with spacings and a UV-cured resin layer 7. Each metal electrode 42 includes an undercoat layer 11 of, e.g., Mo, a low-resistance metal layer 12, e.g., of Cu, and a protective layer (preferably an electroconductive protective layer) 41 of a chemically stable metal or alloy, such as Mo, Ta, W, Ti, Au, Ni, Zn or their alloys (Ni: for seventh embodiment, Zn for eighth embodiment and Zn—Ni alloy for ninth embodiment).

The electrode plate 40 further includes transparent electrodes (not shown) and an alignment control layer (not shown) similarly as in the preceding embodiments, thus being used as electrode plates 3a and 3b for constituting a liquid crystal device 1 as shown in FIG. 1.

Seventh Embodiment

FIGS. 11A–11D, 12 and 13 are schematic views for illustrating a series of steps generally involved in a process for producing an electrode plate of this embodiment.

PRODUCTION EXAMPLE 7

Figure 11A:
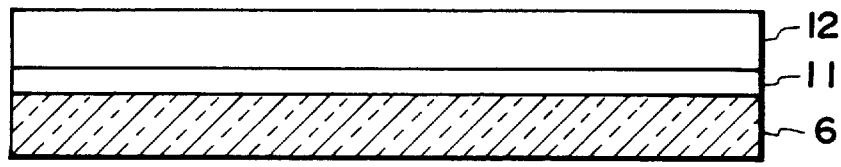
FIGS. 11A–11D are schematic sectional views for illustrating a process for producing an electrode plate according to Seventh to Ninth embodiments in the present invention.

On a 1 mm-thick glass substrate 6, a 200 nm-thick undercoat layer 11 of Mo and a 2 μm-thick low-resistance metal layer 12 of Cu were successively formed by sputtering similarly as in First embodiment (FIG. 11A).

Figure 11B:
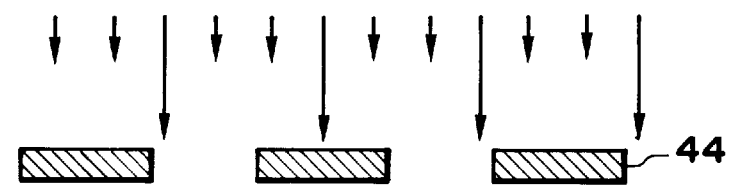
Figure 11B:
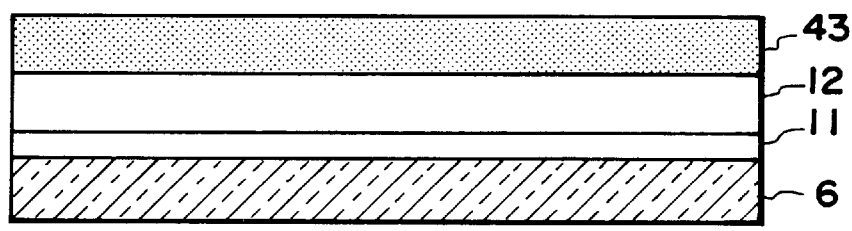
Figure 11C:
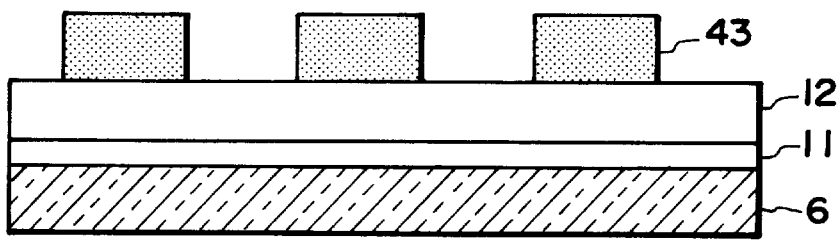

Onto the metal layer 12 of Cu, a 2 μm-thick photoresist 43 was applied by spin coating and exposed to light though a patterned mask 44, followed by development of the photoresist 43 to form a prescribed pattern of the photoresist 43 on the metal layer 12 of Cu (FIGS. 11B and 11C).

Figure 11D:
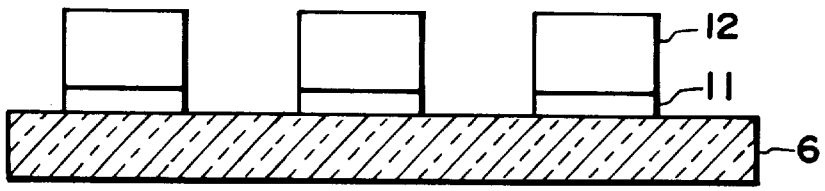

Then, the thus-treated glass substrate 6 was etched with a mixture etchant (phosphoric acid, nitric acid and water) to remove portions of the layers 11 and 12 not covered with the photoresist pattern 43, followed by removal of the photoresist pattern 43 to form a patterned undercoat layer 11 (Mo film) and low-resistance metal layer 12. (Cu film) on the glass substrate 6 (FIG. 11D).

Figure 12:
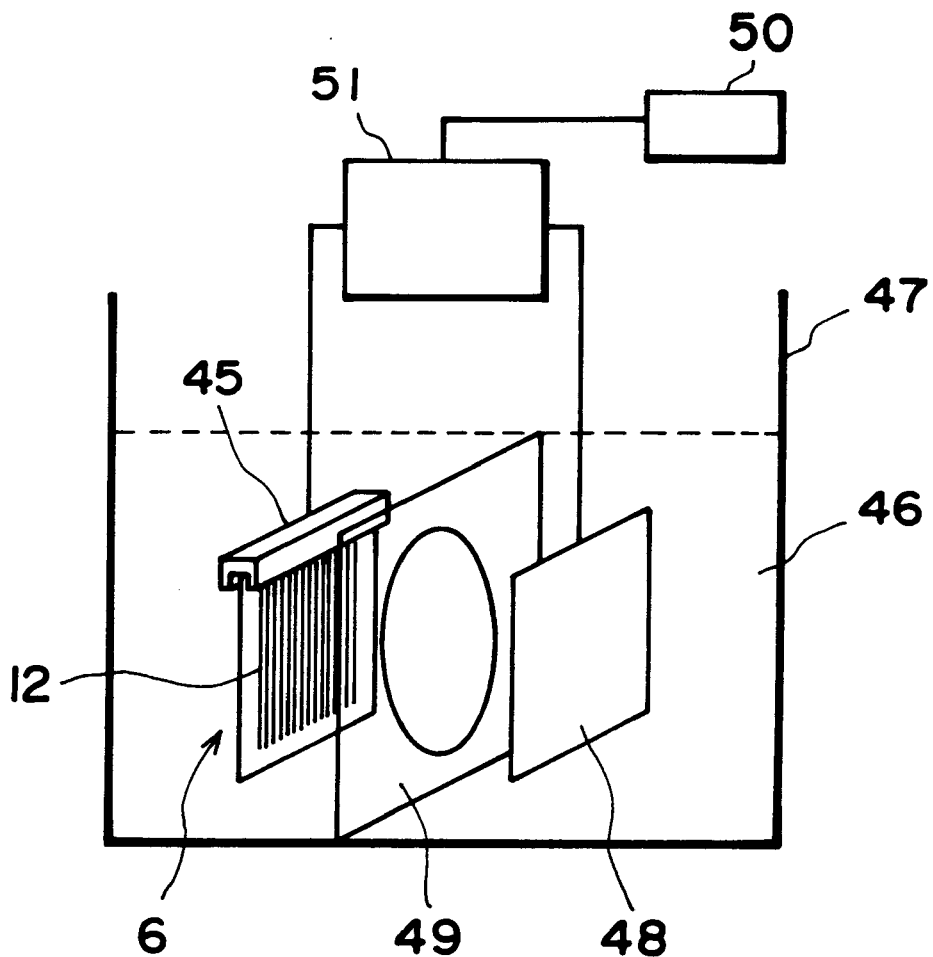
FIG. 12 is an illustration showing a step of forming a coating (protective) layer on metal electrodes by electroplating in Seventh to Ninth embodiments.
Figure 13:
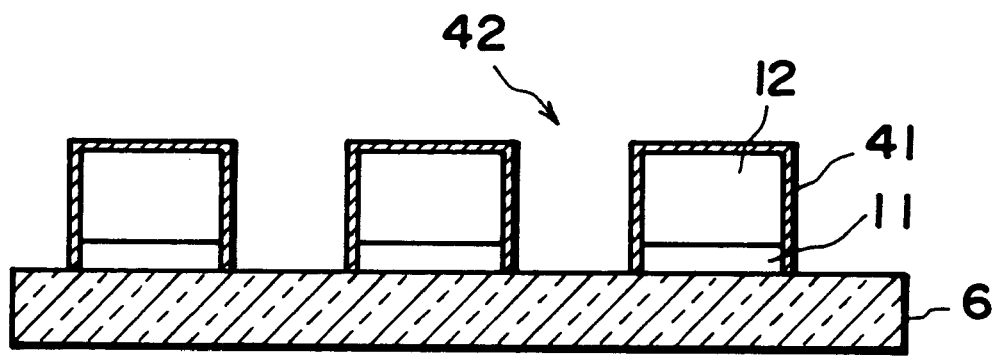
FIG. 13 is a schematic sectional view of a resultant electrode plate prepared by a production process thereof according to Seventh to Ninth embodiments in the present invention.

Thereafter, the glass substrate 6 (having thereon the patterned layer 11 and 12) was subjected to emulsion washing in a mixture liquid of kerosene, a surfactant and water and then immersed in an electrolytic solution 46 in an electrolytic tank 47 after electrically connected with a cathode substrate-plating rack 45 as shown in FIG. 12. In the electrolytic tank 47, the glass substrate 6 was disposed opposite to an anode electrode 48 via a heart ring cell disposed therebetween so as to narrow a cathode face to uniformize a current distribution on the entire cathode face. The plating rack 45 and the anode electrode 48 were electrically connected with a power supply 51 equipped with a pulse oscillator 50.

By using the above electroplating system, a 50 nm-thick protective layer 41 of Ni was formed at an entire exposed surface of the layers 11 an 12 (FIG. 13) under the following conditions.

Electrolytic solution: a mixture of $NiSO_4$ (1M)/$H_3BO_3$ (0.5 M)/$H_2O$ (water).
Liquid temperature: 25° C.
Voltage: rectangular pulse between +2.5 volts (higher side) and −1 volt (lower side) inverted at a pulse duration of 0.1 msec.
Current density: 3 A/dm² (cathod), 2 A/dm² (anode)
Time: 5 min.

Then, by using the thus-treated glass substrate 6, an electrode plate 40 including metal electrodes 42 embedded with a UV-cured resin 7 as shown in FIG. 7 was formed in the same manner as in Production Example 1 (though the steps shown in FIG. 2C to FIG. 3E).

Figure 14:
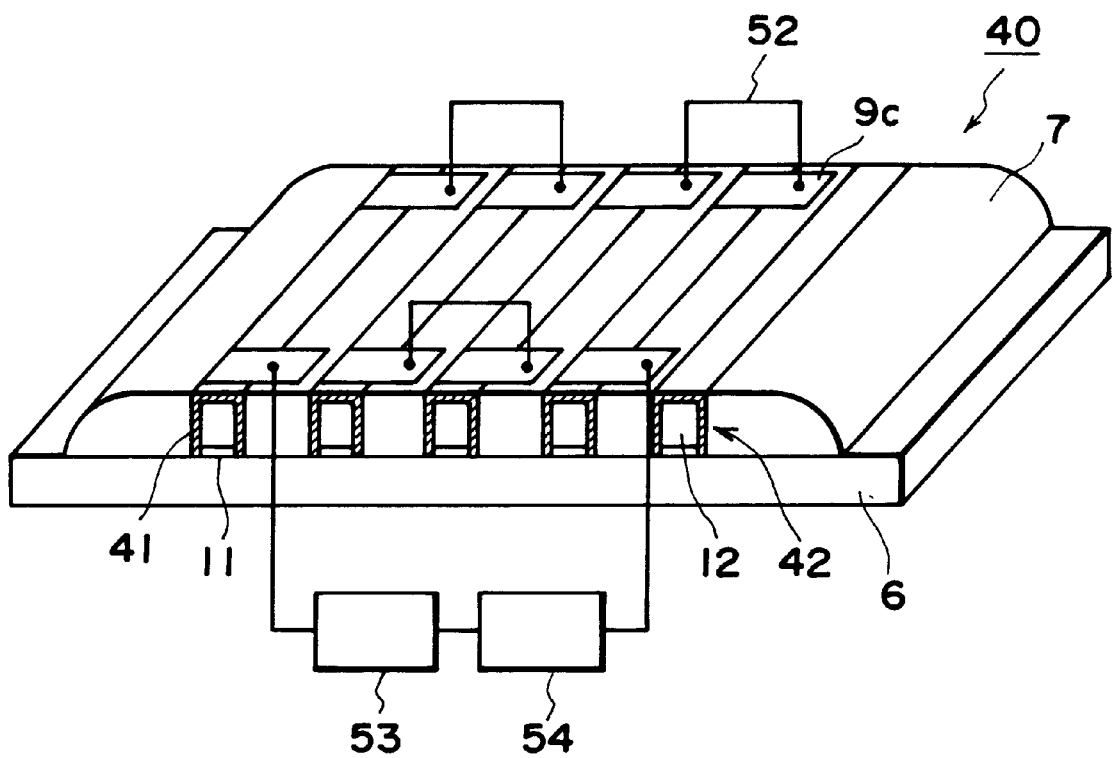
FIG. 14 is a schematic illustration showing a test method for evaluating a liability of the electrode plate according to Seventh to Ninth embodiments in the present invention.

The thus prepared electrode plate 40 was further coated with patterned transparent electrodes 9c electrically connected with each other in series by conductive wires. Both terminals of this electrical connection system were connected with a DC power supply 53 and an ammeter 54 to measure a current passing therethrough as shown in FIG. 14.

The film-forming and patterning conditions of the transparent electrodes 9c were as follows.
(Film-forming Conditions)
  Method: RF sputtering (load-lock passing scheme)
  Target: $In_2O_3$—$SnO_2$ (density=85%, In:Sn=82%:18% as sintered form)
  Pressure: $3\times10^{-3}$ torr
  Gas flow: 100 sccm (Ar+$O_2$ (2%))
  Substrate temperature: 200° C.
  Power: 1.5 W/cm²
(Patterning Conditions)
  Photoresist: Negative-mode photoresist ("OMR-85", mfd. by Tokyo Ohka Kogyo K.K.; thickness 2 $\mu$m)
  Etching: Plasma etching process using RF parallel plate electrode
  Etching pressure: $5\times10^{-3}$ torr
  Gas flow: 100 sccm (Ar+$O_2$ (2%))

As a result of the above-described measurement, the metal electrodes 42 were found to be not increased in the electrical resistance when compared with before the formation of the UV-cured resin layer 7 and also found to be not corroded.

Accordingly, in this embodiment, in addition to the above-mentioned effects of First embodiment, it was possible to prevent the metal layer 12 of Cu from being exposed to solvents within and gaseous components generated from the UV-curable resin 7 by completely coating the Cu layer 12 with the protective layer 41 of electroplated Ni.

Further, when an adhesive tape was attached to the protective layer 41 and then peeled therefrom for evaluating an adhesiveness between the protective (Ni) layer 41 and the inner metal (Cu) layer 12, no peeled portion was confirmed and accordingly both the layers 41 and 12 were found to provide a good adhesive state.

Incidentally, a thick protective layer 41 results in a layer having a high resistivity (or electrical resistance). For this reason, the protective layer 41 may desirably be as thin as possible (preferably have a thickness of 20–100 nm, particularly 40–60 nm) as long as the inner Cu layer 12 is not corroded by the UV-curable resin. Accordingly the protective layer 41 may preferably be formed uniformly by setting a relatively small film-forming speed (deposition rate) so as to attain a high controllability.

Further, in this embodiment, it is possible to perform an electroplating treatment of the metal layer 12 with respect to plural glass substrates at the same time in an identical electroplating step as shown in FIG. 12, thus resulting in an improved production efficiency and a reduced production cost.

Eighth Embodiment

In this embodiment, referring to FIG. 10, an electrode plate 40 includes metal electrodes 42 each comprising an undercoat layer 11 of Mo, a low-resistance metal layer 12 of Cu and a protective layer 41 of Zn.

PRODUCTION EXAMPLE 8

An electrode plate 40 was prepared and evaluated in the same manner as in Production Example 7 except that a 50 nm-thick protective layer 41 of Zn was formed by using an electrolytic solution comprising a mixture of $ZnSO_4$ (1M)/$H_3BO_3$ (0.5M)/$H_2O$, whereby effects similar to those of Seventh embodiment were attained principally due to the electroplated Zn layer 41.

Ninth Embodiment

In this embodiment, referring to FIG. 10, an electrode plate 40 includes metal electrodes 42 each comparison an undercoat layer 11 of Mo, a low-resistance metal layer 12 of Cu and a protective layer 41 of Zn—Ni alloy.

PRODUCTION EXAMPLE 9

An electrode plate 40 was prepared and evaluated in the same manner as in Production Example 7 except that a 50 nm-thick protective layer of Zn—Ni alloy (Ni=ca. 10%) was formed at 30° C. by using an electrolytic solution comprising a mixture of $NiSO_4$ (1M)/$ZnSO_4$ (0.5M)/$H_3BO_3$ (0.3M)/$NH_4Cl$ (0.25M)/$H_2O$, whereby effects similarly as in Seventh embodiments were attained.

In the above-described Seventh to Ninth embodiments, it is possible to use a metal, such as Cr, Al or Pt, as a material for forming the protective layer 41.

When liquid crystal devices are formed by using the above-mentioned protective layers 41 of Ni, Zn and Zn—Ni alloy, respectively, used in Production Examples 7–9, otherwise similarly as in Production Example 1, all the resultant liquid crystal devices are improved in display qualities since the respective protective layers 41 are effective in preventing corrosion and a change in resistance of metal electrodes to suppress voltage waveform distortion due to signal delay, thus allowing a stable drive voltage application. Further, the use of the thin (50 nm) protective layer 41 little affects the electrical resistance of the metal electrodes and is effective in keeping a flatness (or smoothness) of a boundary between the metal electrodes and the transparent electrodes.

Tenth Embodiment

Figure 15A:
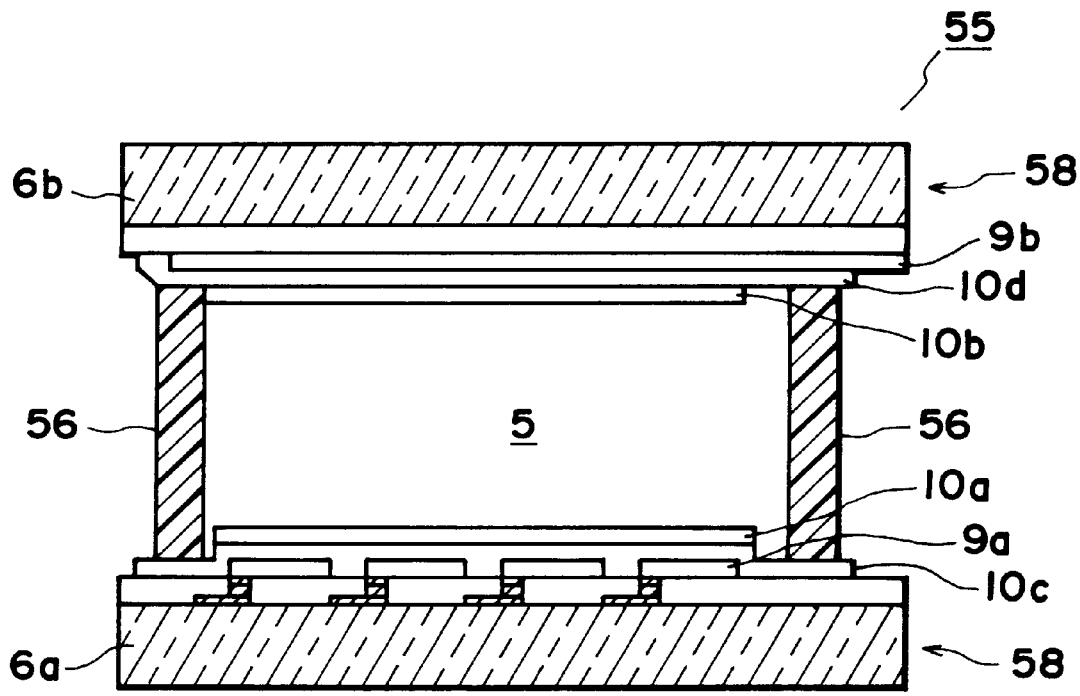
FIGS. 15A and 15 and FIGS. 17A and 17B are respectively schematic sectional views of the examples of a liquid crystal device and an electrode plate according to Tenth embodiment in the present invention; including FIGS. 15A and 17A which show a liquid crystal device and a liquid crystal device provided with a color filter, respectively, and FIGS. 15B and 17B which show an electrode plate and an electrode plate provided with a color filter layer, respectively.
Figure 15B:
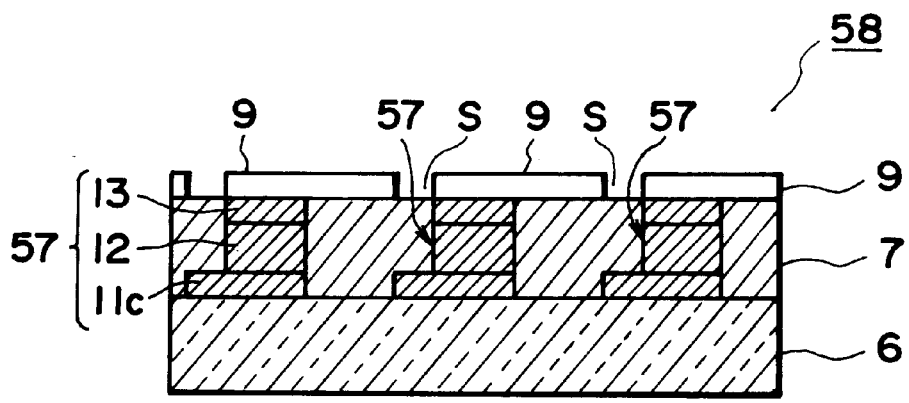

FIG. 15A shows an example of a liquid crystal device according to this embodiment and FIG. 15B shows an electrode plate used in the liquid crystal device.

Referring to FIG. 15A, a liquid crystal device 55 includes a pair of oppositely disposed electrode plates 58 bonded to each other by a sealing agent 56 while leaving a gap filled with a liquid crystal 5, and further includes an insulating layers 10c and 10d each disposed between transparent electrodes 9a (or 9b) and an alignment control layer 10a (or 10b), otherwise similarly as in the liquid crystal device 1 of First embodiment.

Each electrode plate 58, as shown in FIG. 15B, include metal electrodes 57 each having a structure similar to that shown in FIG. 4 representing the electrode plate 3 prepared in Production Example 1 except for an undercoat layer 11c.

More specifically, the undercoat layer 11c may be made of a material identical to that for the undercoat layer 11 as described hereinabove but have a width larger than a low-resistance metal layer 12 formed thereon and a protective layer 13 formed on the metal layer 12 by a portion uncovered with the layers 12 and 13 (hereinbelow, referred to as "projected portion"), so that such a projected portion of the undercoat layer 13 is effective in intercepting (interrupting) light passing through all or at least a part of a spacing S between adjacent transparent electrodes 9 as shown in FIG. 15.

The undercoat layer may have a thickness sufficient not to cause visible light transmission and thus may preferably have a thickness of at least 500 Å (e.g., ca. 1000 Å).

Then, a process for producing the liquid crystal device 55 described above in this embodiment will be described with reference to FIGS. 16A–16H.

(Metal Electrode-forming Step)

Figure 16A:
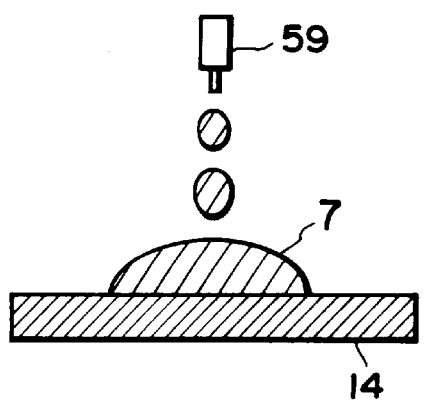
FIGS. 16A–16H and FIGS. 18A–18F are respectively schematic sectional views each showing a series of steps generally involved in a process for producing the electrode plate according to Tenth embodiment.
Figure 16E:
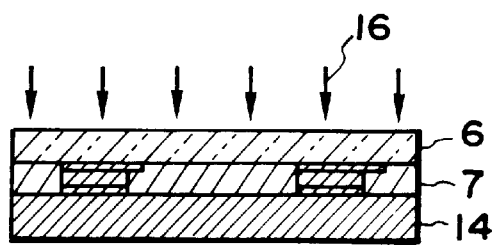
Figure 16B:
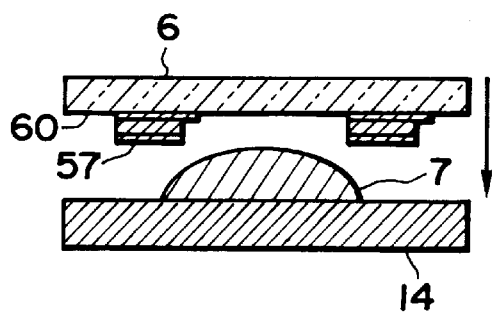
Figure 16F:
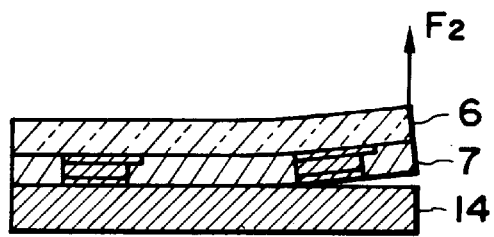

In this step, a plurality of patterned metal electrodes 57 are formed with spacings therebetween on a glass substrate 6 as shown in FIG. 16B (upper side).

More specifically, an undercoat layer 11c (as shown in FIG. 15B) of a metal or alloy, such as Ti, Cr, Mo, W, Al, Ta, Ni or alloys thereof, is formed on the glass substrate 6 by vacuum deposition, such as sputtering. On the undercoat layer 11c, a low-resistance metal layer 12 of Cu is formed by a film-forming method, such as sputtering or electroplating, and thereon a protective layer 13 of a metal or alloy, such as Ti, Cr, Mo, W, Al, Ta, Ni, Au, Zn or alloys thereof, is formed by vacuum deposition (e.g., sputtering) or electroplating. Then, patterning of these three layers 11c, 12 and 13 is performed by, e.g., chemical etching, dry etching, electroplating with a mask or lift-off method, to provide the glass substrate 6 having the patterned metal electrodes 57 at its wiring face 60 (a face at which the metal electrodes 57 are formed).

In the case of forming the protective layer 13 of Mo, Ta, W, Ti, Cr, Ni or their alloys, vacuum deposition, particularly sputtering, may preferably e adopted. On the other hand, electroplating may preferably be used for forming the protective layer 13 of, e.g., Ni, Ni alloy or Au.

(Resin-filling Step)

At spacings between the metal electrodes 57, an UV-curable resin 7 is filled (FIGS. 16A–16D).

First, a prescribed amount of an UV-curable resin 7 is placed dropwise on a smooth plate 14 or the wiring face 60 of the glass substrate 6 (on the smooth plate 14 in this embodiment) (FIG. 16A).

Then, the smooth plate 14 and the glass substrate 6 are applied to each other via the UV-curable resin 7 and the metal electrodes 57 (FIG. 16B) to form a pressure-receiving (or integrated) structure.

Figure 16C:
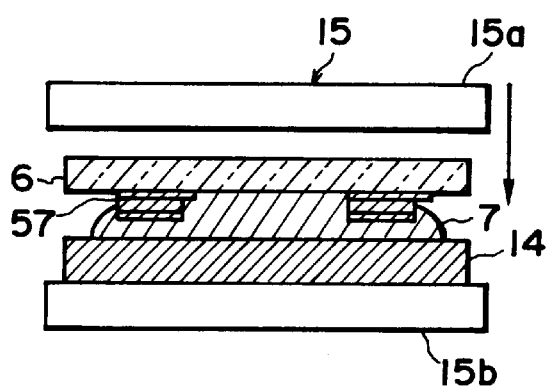

The pressure-receiving structure is sandwiched between a pair of pressing plates 15a and 15b of a press 15 and the press 15 is operated (FIG. 16C).

Figure 16G:
Figure 16D:
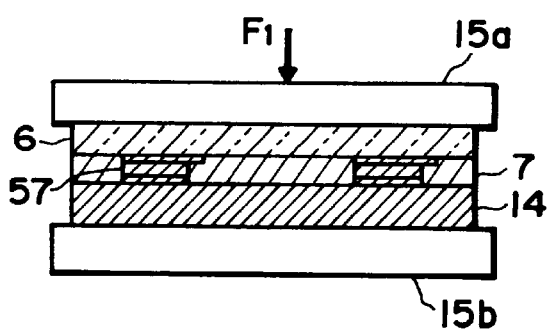

The upper pressing plate 15a is moved in a direction of an arrow $F_1$ to press the pressure-receiving structure with the plates 15a and 15b (FIG. 16D). At this time, the surface of the protective layer 13 and the UV-curable resin supplied between the metal electrodes 57 contact the smooth plate 14 and are pressed thereagainst at a pressure sufficient to effect uniform pressing operation over the entire glass substrate 6, whereby the UV-curable resin 7 is removed from at least a portion of the surface of the protective layer 13 and effectively fill the spacings between the metal electrodes 57 to form a substantially smooth surface together with the protective layer 13. Further, it is also important to remove the resin 7 from the surface of the protective layer in view of electrical conduction between the metal electrodes 57 and transparent electrodes 9 forming a later step.

(Resin-curing Step)

After the pressing operation by the press 15 is terminated, the pressure-receiving structure is taken out from the press 15 and irradiated with UV rays 16 issued from outside the glass substrate 6 toward the UV-curable resin 7 to cure the UV-curable resin 7 (FIG. 16E).

Then, the smooth plate 14 is removed or peeled from the glass substrate 6 by exerting a force in a direction of an arrow $F_2$ with a peeling mechanism (not shown) (FIG. 16F), thus providing the glass substrate 6 with a substantially smooth surface in combination of the UV-cured resin 7 and the metal electrodes 57 (FIG. 16G).

(Transparent Electrode-forming Step)

Figure 16H:
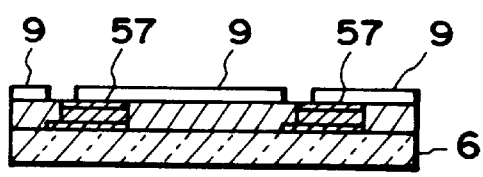

On the substantially smooth surface of the thus-treated glass substrate 6, a plurality of transparent electrodes 9 are formed each with a spacing S (FIG. 16H).

More specifically, e.g., a ca. 1200 Å-thick ITO film is formed on the glass substrate 6, followed by patterning and etching through a photolithographic process.

(Other Steps)

Thereafter, an insulating layer 10c (or 10d) (not shown) and an alignment control layer 10a (or 10b) (not shown) are successively formed on the transparent electrodes 9 to prepare an electrode plate 58 (corresponding to the electrode plate 3a or 3b of the liquid crystal device 1 shown in FIG. 1).

The thus-prepared pair of electrode plates 58 is disposed opposite to each other while leaving a gap, which was then filled with a (chiral smectic) liquid crystal to obtain a liquid crystal device 55 as shown in FIG. 15.

Figure 17A:
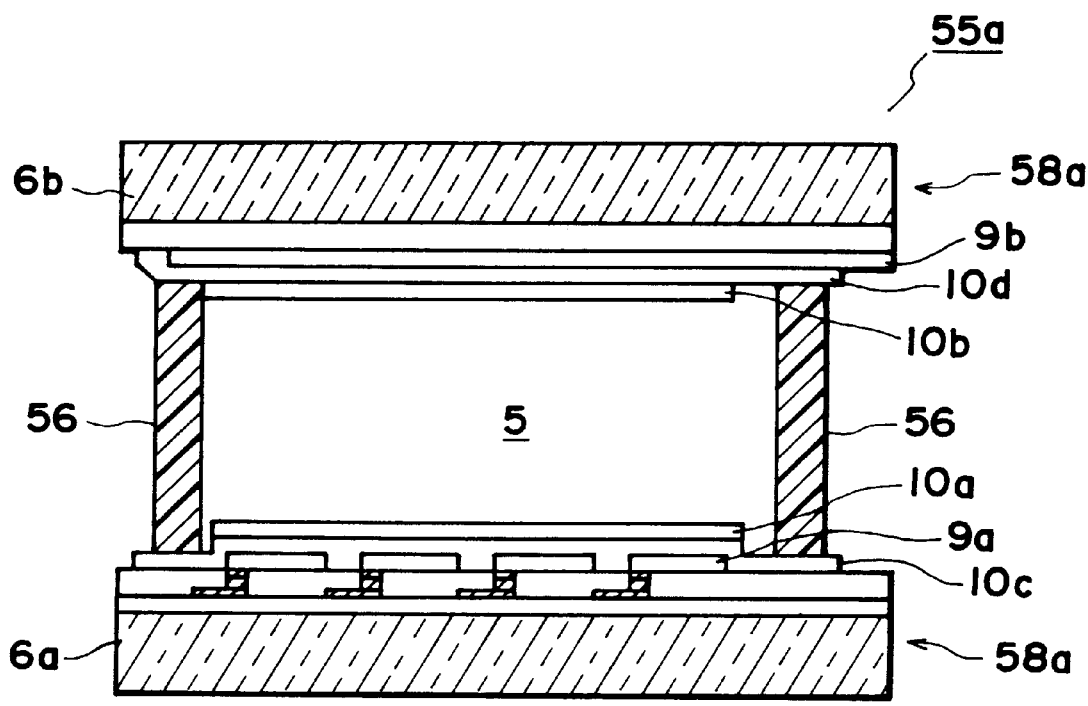
Figure 17B:
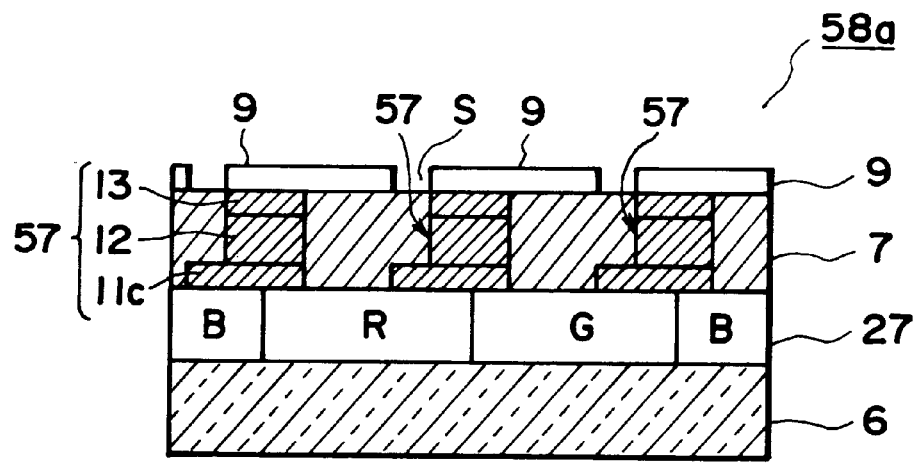

FIG. 17A shows another example of a liquid crystal device according to this (Tenth) embodiment and FIG. 17B shows an electrode plate used in the liquid crystal device.

Referring to FIGS. 17A and 17B, a liquid crystal device 55a includes a pair of electrode plates 58a each including a color filter layer 27 disposed directly on a glass substrate 6, otherwise similarly as in the liquid crystal device 55 as the former example of this embodiment.

The color filter layer 27 may be formed in the same manner as in Fourth to Sixth embodiments described above by using various inks including a pigment-containing photosensitive (or thermosetting) resin and a dye-containing ink.

When the color liquid crystal device 58a was produced, no peeling of the metal electrodes 57 from the color filter layer 27 was observed due to a good adhesive property of a metal material (Ti, Cr, Mo, W, Al, Ta, Ni or their alloys) for the undercoat layer 11c.

PRODUCTION EXAMPLE 10

A 1.1 mm-thick glass substrate 6 of blue plate glass was sufficiently washed and, after drying, coated with a 1000 Å-thick undercoat layer 11c of Ni—Mo alloy (Mo=8.3 mole %) by sputtering under the following conditions.

Target: Ni—Mo alloy (Mo=8.3 mole %)

Power: 3.5 W/cm$^2$

Pressure: 0.6 Pa

Gas: Ar

Substrate temperature: 200° C.

Figure 18A:
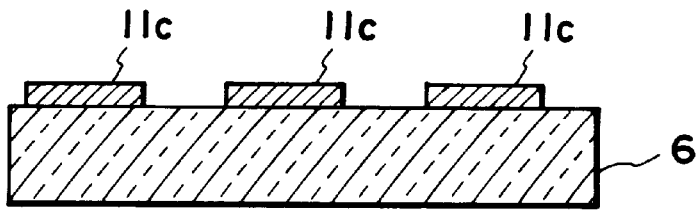

The undercoat layer 11c was patterned in a prescribed shape through a photolithographic process wherein a photoresist ("OFPR-800", mfd. by Tokyo Ohka Kogyo K.K.) was patterned and the undercoat layer 11c was etched with ferric chloride (etchant) (FIG. 18A).

Figure 18B:
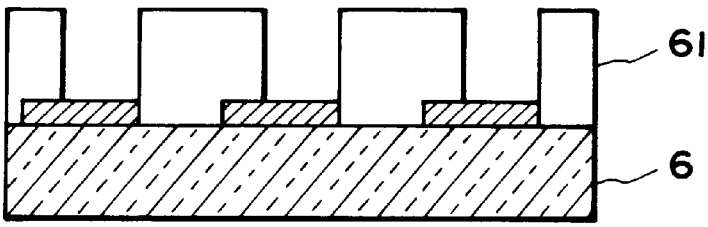

Then, as shown in FIG. 18B, a plating-resist 61 (a photoresist "OFPR-800", mfd. by Tokyo Ohka Kogyo K.K.) was formed on the glass substrate 6 so as to cover a part (projected portion) of the undercoat layer 11c. Thereafter, the thus-treated glass substrate 6 was immersed in an electroless (chemical) plating-liquid ("OPC-750M", mfd. by Okuno Seiyaku K.K.) for 20 min. at 23° C. to form a 0.3 $\mu$m-thick electroless plating Cu layer on the undercoat layer 11c.

Figure 18C:
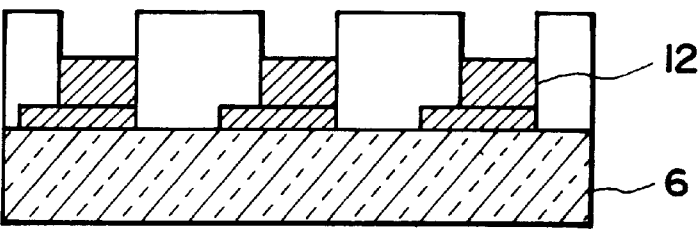

Further, the glass substrate 6 was held by a plating-holding member so as to pass a current through the respective portions of the undercoat layer 11c and immersed in a copper sulfate plating-liquid ("Copper Gleam LX", mfd. by Nippon Lea Ronal K.K.) to effect electroplating for 2 min. at a current density of 0.02 A/cm$^2$, thus forming a 1 μm-thick low-resistance metal layer 12 of Cu (FIG. 18C).

Figure 18D:
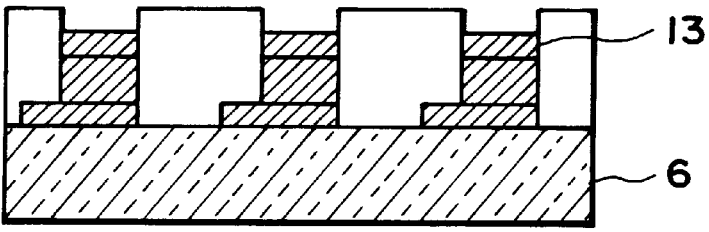

The thus-treated glass substrate 6 was washed with pure water and then was immersed in a nickel sulfate plating-liquid ("Nikal PC-3", mfd. by Nippon Lea Ronal K.K.) to effect electroplating at a current density of 0.01 A/cm$^2$, thus forming a 1000 Å-thick protective layer 13 of Ni (FIG. 18D).

Figure 18E:
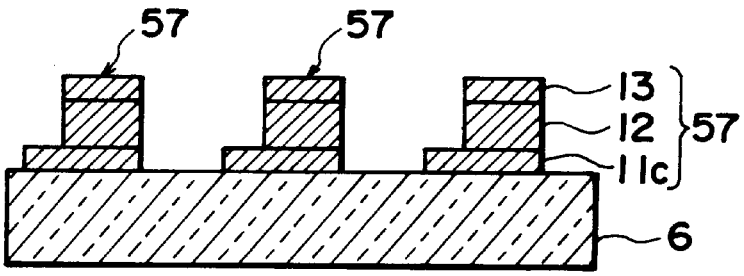

Then, the plating-resist 61 was removed by using a peeling liquid to provide the glass substrate 6 with metal electrodes 57 having a prescribed pattern (FIG. 18E).

Figure 18F:
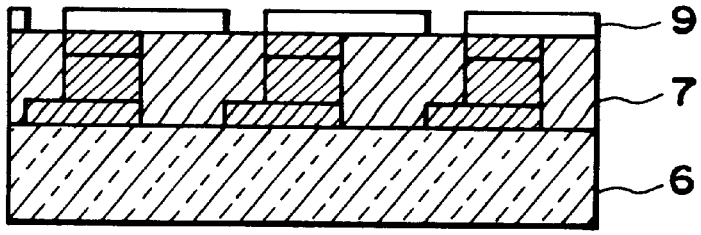

Then, in spacings of the metal electrodes 57, a UV-curable resin 7 was filled to form a substantially smooth surface together with the metal electrodes 57 under pressure with a roller press (not shown). On the surface, after curing the UV-curable resin 7, 1200 Å-thick transparent electrodes 9 of ITO was formed through sputtering and a photolithographic process including patterning and etching (FIG. 18F).

According to this embodiment, the undercoat layer 11c has a projected portion or which the metal layer 12 and the protective layer 13 are not formed and has a thickness (1000 Å) sufficient to effect light-interruption, thus effectively perform prevention of transmission (leakage) of light passing through the spacing S (as shown in FIG. 15B) when the resultant liquid crystal device is driven.

In this embodiment, the low-resistance metal (Cu) layer 12 and the protective (Ni) layer 13 are formed by using an inexpensive wet process-plating apparatus (system), thus reducing a production cost when compared with vacuum deposition (e.g., sputtering). Further, a film-forming speed is enhanced in the case of the wet process plating, so that it is possible to effect a production of the electrode plate with a high throughput even when a thick Cu layer 12 is formed, thus resulting in a reduced production cost.

Further, the use of the undercoat layer 11c of Ni—Mo alloy exhibiting a high adhesive property, the low-resistance metal layer 12 of Cu exhibiting a high electrical conductivity, and the protective layer 13 of Ni exhibiting an anti-oxidizing property better than Cu bring about various advantageous effects as described in the preceding embodiments (First to Ninth embodiments).

(Eleventh Embodiment)

FIGS. 19A–19F show a series of steps generally involved in a process for producing an electrode plate in this embodiment.

Figure 19A:
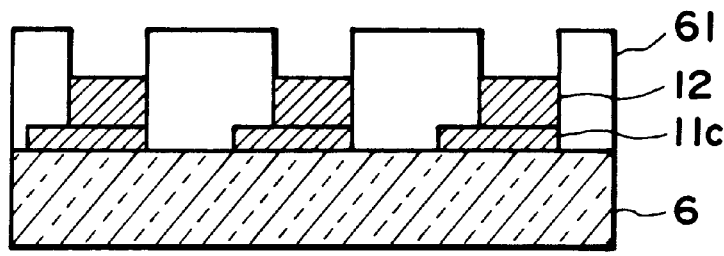
FIGS. 19A–19D are respectively schematic sectional views for illustrating a series of steps generally involved in a process for producing an electrode plate according to Eleventh embodiment in the present invention.
Figure 19B:
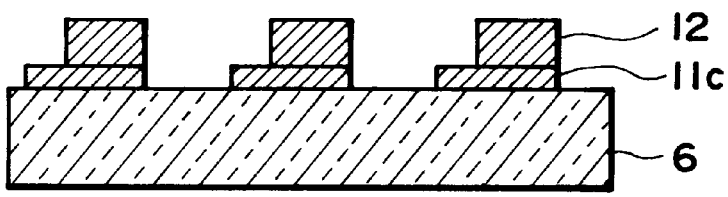
Figure 19C:
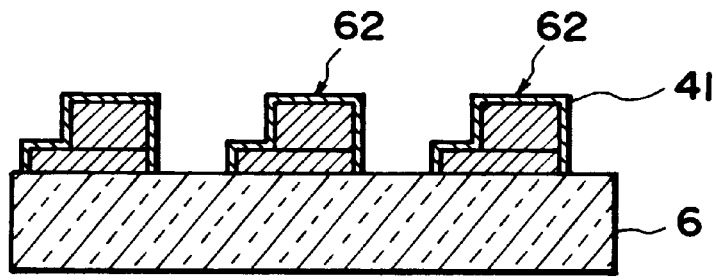
Figure 19D:
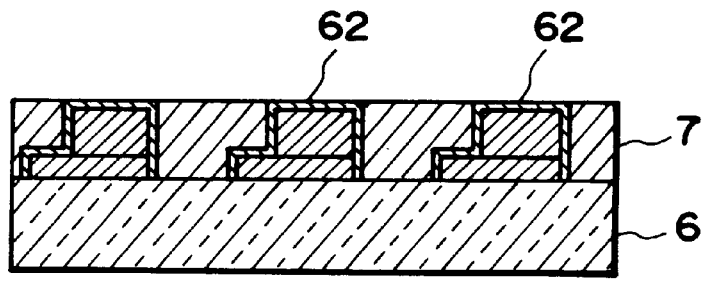
Figure 20A:
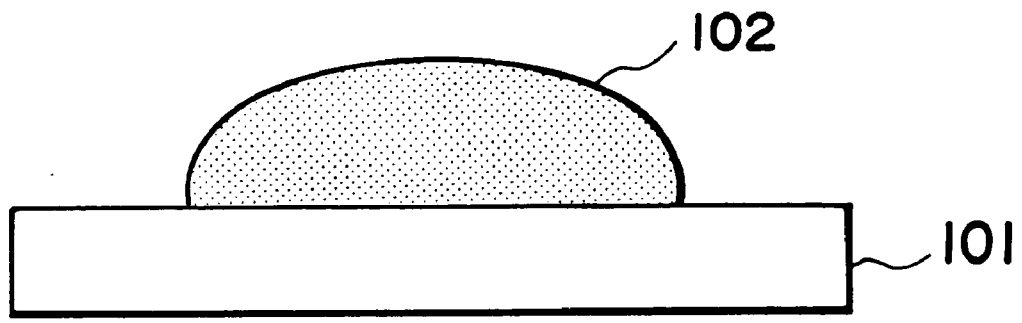
FIGS. 20A, 20B and 21A–21E are schematic sectional views for illustrating a series of steps generally involved in a prior art process for producing an electrode plate.
Figure 20B:
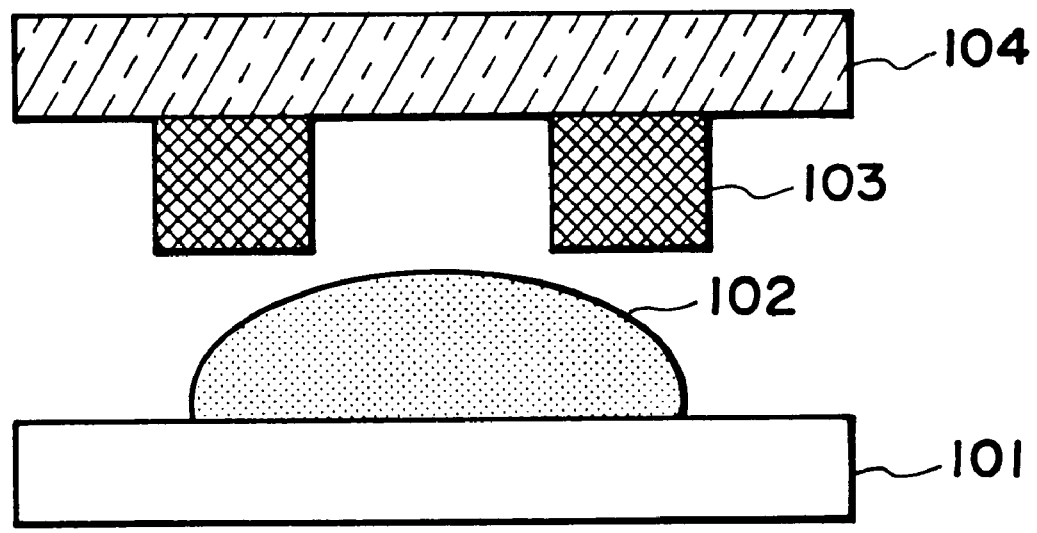
Figure 21A:
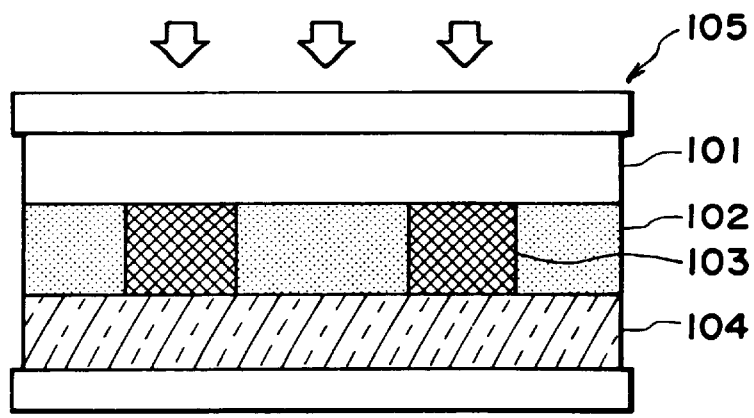
Figure 21B:
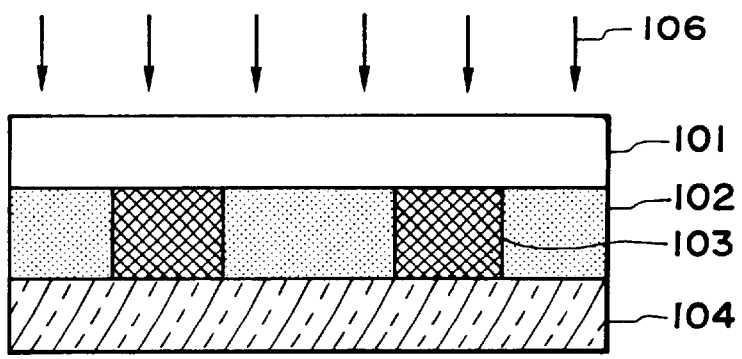
Figure 21C:
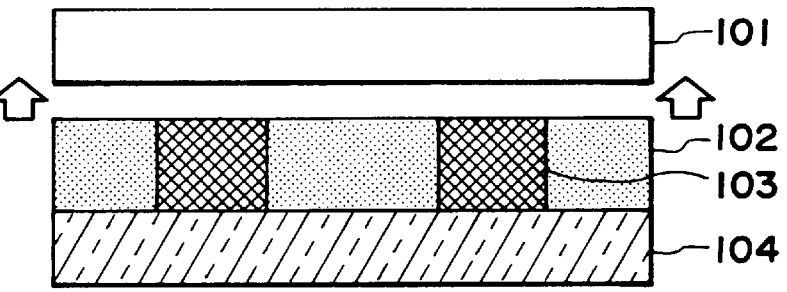
Figure 21D:
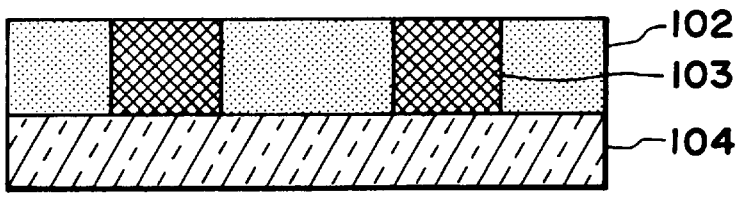
Figure 21E:
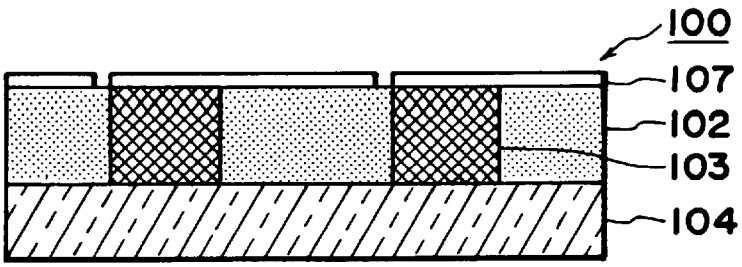

The electrode plate includes metal electrodes 62 identical to those of the electrode plate prepared in Production Example 10 except that a protective layer 41 is formed so as to coat an entire exposed surface of lower layers (low-resistance metal layer 12 and an undercoat layer 11c) as shown in FIGS. 19B and 19C.

PRODUCTION EXAMPLE 11

An electrode plate was prepared in the same manner as in Production Example 10 except that a protective layer 41 was formed in the following manner (FIGS. 19A–19D).

After forming a 1 mm-thick low-resistance metal layer 12 of Cu as shown in FIG. 19A, a plating-resist 61 was removed (FIG. 19B) and a treated glass substrate 6 was held by a plating-holding member so as to effect uniform electrical conduction with respect to patterned portions formed thereon.

Then, the glass substrate 6 was immersed in a nickel sulfate plating-liquid ("Nikal PC-3", mfd. by Nippon Lea Ronal K.K.) to effect electroplating at a current density of 0.01 A/cm$^2$, thus forming a 1000 Å-thick protective layer 13 of Ni covering an entire exposed surface of the metal (Cu) layer 12 and the undercoat (Ni—Mo) layer 11c to provide the glass substrate 6 with patterned metal electrodes 62 (FIG. 19C).

According to this embodiment, similarly as in Seventh embodiment, it is possible to further improve an anti-corrosive (corrosion resistant) property of the metal electrodes 62 due to the protective layer 41 entirely coating the lower layer-exposed surface.

In this respect, when the above-prepared electrode plate was left standing for 200 hours in an high-temperature and high-humidity environment (75° C., 80% RH), no occurrence of corrosion of the metal electrodes 62 was confirmed, thus resulting in an excellent durability.

In the present invention, each metal electrode may further include one or two or more layers (e.g., a laminated protective layer of two or more layers). Further, the metal electrode may be formed in two layers of an undercoat layer (11, 11c) and a low-resistance metal layer (12) in the case where a metal material for the metal layer has a good anti-corrosive property. On the other hand, if such a metal material has a good adhesiveness to the glass substrate 6, the metal electrode may be formed in two layers of the metal layer (12) and a protective layer (13, 41).

With respect to adhesive properties of 7 metal materials (Ti, Mo, W, Al, Ta, Ni, Cr) to a glass substrate 6 and a color filter layer 27, we have conducted the following experiment.
<Experiment>

Seven electrode plates 58 as shown in FIG. 15B (but excluding the transparent electrodes 9) and seven electrode plates 58a each provided with a color filter layer 27 as shown in FIG. 17B (but excluding the electrode plates 9) were prepared in the following manner.

On each glass substrate 6 (blue plate glass) or glass substrate 6 having a color filter layer (photosensitive resin containing pigments dispersed therein), a 1000 Å-thick undercoat layer (first layer) 11c (of Ti, Mo, W, Al, Ta, Ni or Cr) was formed by sputtering. On the undercoat layer 11c, a 1 μm-thick low-resistance metal layer (second layer) 12 (of Cu) was formed in the same manner as in Production Example 10 and thereon, a 1000 Å-thick protective layer (third layer) 13 (of Ti, Mo, W, Al, Ta, Ni or Cr) was formed by sputtering to form a metal electrode layer comprising three layers 11c, 12 and 13.

Then, the metal electrode layer was patterned so as to have a shape as shown in FIG. 15B or FIG. 17B by an etching treatment through a photolithographic process to form metal electrodes 57 each comprising patterned first to third layers 11c, 12 an 13.

The etching treatment was performed by first etching the third layer 13 with a particular etchant selectively removing the third layer but not removing the second layer 12 of Cu. For example, with respect to, e.g., Cr, Al, W and Mo, an alkali etchant of red prussiate of potash (potassium ferricyanide) was used since this etchant selectively removed the above metal materials but did not remove Cu. In a similar manner as above, the second layer 12 and the first layer 11c were separately subjected to etching.

Then, a UV-curable resin 7 was filled in spacings between the metal electrodes 57 under pressure using a smooth plate and was cured by irradiation with UV rays, followed by removal of the smooth plate to prepare a sample substrate as shown in FIG. 16G or a sample substrate provided with a color filter layer.

Each sample substrate was scribed or partially cut by a cutter in such a manner that a 25 mm-square region of the surface where the metal electrodes 57 and the UV-cured resin layer 7 were formed was divided into 25 square portions each having a size of 5 mm×5 mm.

Then, a cellophane tape (mfd. by Nichiban K.K.) was attached to the above region and detached therefrom. After repeating ten times this operation, the number of peeled portions from the region of the sample substrate surface was counted.

The results are shown below.

|  | (metal of 1st and 3rd layers) | | | | | | |
| --- | --- | --- | --- | --- | --- | --- | --- |
|  | Ti | Mo | W | Al | Ta | Ni | Cr |
| (on glass substrate) | 0 | 0 | 10 | 3 | 0 | 0 | 0 |
| (on color filter) | 0 | 0 | 15 | 10 | 0 | 0 | 0 |

As shown above, the undercoat layers 11c of W and Al were found to exhibit less adhesive property to the glass substrate and the color filter layer disposed thereunder.

Then, all the sample substrates were respectively further provided with 1000 Å-thick of ITO by sputtering in a region not scribed by the cutter and were evaluated in terms of electrical conduction with the associated metal electrodes.

As a result, the sample substrates using Al caused conduction failure.

Accordingly, as the metal material for the first and third layers, it is preferred to use Ti, Mo, Ta, Ni or Cr. However, Ti and Ta are two to three times as expensive as other metal materials and Cr is required to considerable cost with respect to disposal of etching waste liquid since Cr is toxic or poisonous material.

Therefore, Mo and Ni are found to be a particularly suitable material for the undercoat layer 11c and the protective layer 13 in view of performance and economical aspects.

Further, Ni is a magnetic material and thus has a constraint such that a thick sputtering target of Ni cannot be used in the case of effecting ordinary magnetron sputtering. However, this constraint can be eliminated by using an alloy of Ni with Mo (e.g., 8.3 mole % added). As a result, a magnetic flux density is decreased to a level of at most 1000 G (gauss), thus allowing the use of a thicker sputtering target in the magnetron sputtering.

When a sample substrate using Ni—Mo alloy (Mo: 8.3 mole %) was prepared and evaluated in the same manner as above, good results in terms of adhesive property and electrical conductance were attained similarly as in the cases of using Ni and Mo.

In the present invention, the electrode plate may be appropriately modified by using the layer structures and/or film forming processes as described in First to Eleventh embodiments in combination.

As described hereinabove, according to the present invention, an electrode plate includes metal electrodes each having a lamination structure of two or more layers (preferably three or more layers), whereby it is possible to improve an adhesive property to a glass substrate and/or corrosion resistant property while maintaining a good electrical conductivity of metal electrodes as a whole, particularly a low-resistance metal layer of the metal electrodes, electrically connected with transparent electrodes to effectively suppress voltage waveform distortion due to drive signal delay. As a result, it is possible to provide a liquid crystal device with a high definition and a large picture area.

What is claimed is:

1. An electrode plate, comprising:
   a light-transmissive substrate; a plurality of metal electrodes disposed on the light-transmissive substrate with spacings therebetween; an insulating layer disposed at the spacings; and a plurality of transparent electrodes disposed on the metal electrodes and the insulating layer, wherein
   each of the metal electrodes includes a first layer comprising a metal or alloy selected from the group consisting of titanium, chromium, molybdenum, tungsten, aluminum, tantalum and nickel; a second layer comprising copper or silver disposed on the first layer; and an anti-oxidation layer disposed on the second layer, and wherein
   the anti-oxidation layer and the insulating layer as a whole form a substantially flat surface.

2. A plate according to claim 1, wherein the first layer comprises a portion having a prescribed width and is wider than the second layer by the prescribed width of the portion, the portion partially narrowing the spacings between the metal electrodes.

3. A plate according to claim 1, which further comprises an alignment control layer disposed so as to coat the transparent electrodes.

4. An electrode plate, comprising:
   a light-transmissive substrate; a plurality of metal electrodes disposed on the light-transmissive substrate with spacings therebetween; an insulating layer disposed at the spacings; and a color filter layer, wherein
   each of the metal electrodes includes a first layer comprising a metal or alloy selected from the group consisting of titanium, chromium, molybdenum, tungsten, aluminum, tantalum and nickel; a second layer comprising copper or silver disposed on the first layer; and a third layer comprising a metal or alloy selected from the group consisting of molybdenum, tantalum, tungsten, titanium, chromium, nickel and zinc and disposed on the second layer, wherein
   the metal electrodes and the insulating layer are disposed on the color filter layer, the third layer is an anti-oxidation layer, and the anti-oxidation layer and the insulating layer as a whole form a substantially flat surface.

5. A plate according to claim 4, wherein the color filter layer includes a transparent portion.

6. A plate according to claim 4, which further comprises a protective layer disposed on the color filter layer, the metal electrodes and the insulating layer being disposed on the protective layer.

7. An electrode plate, comprising:
   a light-transmissive substrate; a plurality of metal electrodes disposed on the light-transmissive substrate and with spacings therebetween; an insulating layer disposed at the spacings; and a color filter layer, wherein
   each of the metal electrodes includes a first layer comprising copper or silver; and a second layer comprising a metal or alloy selected from the group consisting of molybdenum, tantalum, tungsten, titanium, chromium, nickel and zinc and disposed on the first layer, wherein
   the second layer is an anti-oxidation layer, and the anti-oxidation layer and the insulating layer as a whole form a substantially flat surface and the metal electrodes and the insulating layer are disposed on the color filter layer.

8. A plate according to claim 7, wherein the color filter layer includes a transparent portion.

9. A plate according to claim 7, which further comprises a protective layer disposed on the color filter layer, the metal electrodes and the insulating layer being disposed on the protective layer.

10. An electrode plate, comprising:
    a light-transmissive substrate a plurality of metal electrodes disposed on the light-transmissive substrate with spacings therebetween; an insulating layer disposed at the spacings; and a plurality of transparent electrodes disposed on the metal electrodes and the insulating layer, wherein
    each of the metal electrodes includes a first layer comprising copper or silver; and a second layer comprising a metal or alloy selected from the group consisting of molybdenum, tantalum, tungsten, titanium, chromium, nickel and zinc and disposed on the first layer, the second layer is an anti-oxidation layer, and the anti-oxidation layer and the insulating layer as a whole form a substantially flat surface.

11. A plate according to claim 10, which further comprises an alignment control layer disposed so as to coat the transparent electrodes.

12. A liquid crystal device, comprising:

a pair of electrode plates; and a liquid crystal disposed between the electrode plates, at least one of said pair of electrode plates comprising a light-transmissive substrate; a plurality of metal electrodes disposed on the light-transmissive substrate with spacing therebetween; and an insulating layer disposed at the spacings, wherein each of the metal electrodes includes a first layer comprising a metal or alloy selected from the group consisting of titanium, chromium, molybdenum, tungsten, aluminum, tantalum and nickel; a second layer comprising copper or silver disposed on the first layer; and an anti-oxidation layer disposed on the second layer, wherein the anti-oxidation layer and the insulating layer as a whole form a substantially flat surface.

13. A device according to claim 12, wherein the insulating layer comprises an ultraviolet-cured resin.

14. A device according to claim 12, wherein the second layer comprises copper.

15. A device according to claim 12, wherein the first layer comprises a metal or alloy selected from the group consisting of titanium, molybdenum, tungsten, aluminum, tantalum and nickel.

16. A device according to claim 12, wherein the first layer comprises molybdenum or nickel.

17. A device according to claim 12, which further comprises a layer of a metal oxide disposed between the light-transmissive substrate and the first layer, said metal oxide having a decreased oxygen content.

18. A device according to claim 12, which further comprises an intermediate layer disposed between the first layer comprising a first metal and the second layer comprising a second metal, said intermediate layer comprising the first metal and the second metal.

19. A device according to claim 12, which further comprises a color filter layer disposed at the spacings between the metal electrodes and disposed between the light-transmissive substrate and the insulating layer.

20. A device according to claim 12, which further comprises a color filter layer disposed on the light-transmissive substrate, the metal electrodes and the insulating layer being disposed on the color filter layer.

21. A device according to claim 20, wherein the color filter layer includes a transparent portion.

22. A device according to claim 20, which further comprises a protective layer disposed on the color filter layer, the metal electrodes and the insulating layer being disposed on the protective layer.

23. A device according to claim 12, which further comprising a plurality of transparent electrodes disposed on the metal electrodes and the insulating layer.

24. A device according to claim 23, wherein the first layer comprises a portion having a prescribed width and is wider than the second layer by the prescribed width of the portion, the portion partially narrowing the spacings between the metal electrodes.

25. A device according to claim 23, which further comprises an alignment control layer disposed so as to coat the transparent electrodes.

26. A device according to claim 12, wherein said liquid crystal comprises a chiral smectic liquid crystal.

27. A device according to claim 12, wherein said liquid crystal comprises a ferroelectric liquid crystal.

28. A liquid crystal device, comprising:

a pair of electrode plates; and a liquid crystal disposed between the electrode plates, at least one of said pair of electrode plates comprising at least a light-transmissive substrate; a plurality of metal electrodes disposed on the light-transmissive substrate with spacings therebetween; and an insulating layer disposed at the spacings, wherein each of the metal electrodes includes a first layer comprising a metal or alloy selected from the group consisting of titanium, chromium, molybdenum, tungsten, aluminum, tantalum and nickel; a second layer comprising a copper or silver disposed on the first layer; and a third anti-oxidation layer comprising a metal or alloy selected from the group consisting of molybdenum, tantalum, tungsten, titanium, chromium, nickel and, said third layer being disposed on the second layer, and wherein the anti-oxidation layer and the insulating layer as a whole form a substantially flat surface.

29. A device according to claim 28, wherein the third layer is disposed so as to coat only a surface opposite to a boundary surface between the first and second layers.

30. A device according to claim 28, wherein the third layer is disposed so as to coat an entire exposed surface of the first and second layers.

31. A device according to claim 28, wherein the insulating layer comprises an ultraviolet-cured resin.

32. A device according to claim 28, wherein the second layer comprises copper.

33. A device according to claim 28, wherein the first layer comprises a metal or alloy selected from the group consisting of titanium, molybdenum, tungsten, aluminum, tantalum and nickel.

34. A device according to claim 28, wherein the first layer comprises molybdenum, nickel or an alloy of molybdenum and nickel.

35. A device according to claim 28, which further comprises a layer of a metal oxide disposed between the light-transmissive substrate and the first layer, said metal oxide having a decreased oxygen content.

36. A device according to claim 28, which further comprises an intermediate layer disposed between the first layer comprising a first metal and the second layer comprising a second metal, said intermediate layer comprising the first metal and the second metal.

37. A device according to claim 28, wherein the third layer comprises a metal or alloy selected from the group consisting of molybdenum, tantalum, tungsten, titanium, nickel and zinc.

38. A device according to claim 28, wherein the third layer comprises a metal or alloy selected from the group consisting of molybdenum, nickel and zinc.

39. A device according to claim 28, which further comprises an intermediate layer disposed between the second layer comprising a second metal and the third layer comprising a third metal, said intermediate layer comprising the second metal and the third metal.

40. A device according to claim 28, which further comprises a color filter layer disposed at the spacings between the metal electrodes and disposed between the light-transmissive substrate and the insulating layer.

41. A device according to claim 28, which further comprises a color filter layer disposed on the light-transmissive substrate, the metal electrodes and the insulating layer being disposed on the color filter layer.

42. A device according to claim 41, wherein the color filter layer includes a transparent portion.

43. A device according to claim 41, which further comprises a protective layer disposed on the color filter layer, the metal electrodes and the insulating layer being disposed on the protective layer.

44. A device according to claim 28, which further comprising a plurality of transparent electrodes disposed on the metal electrodes and the insulating layer.

45. A device according to claim 44, wherein the first layer comprises a portion having a prescribed width and is wider than the second layer by the prescribed width of the portion, the portion partially narrowing the spacings between the metal electrodes.

46. A device according to claim 44, which further comprises an alignment control layer disposed so as to coat the transparent electrodes.

47. A device according to claim 28, wherein said liquid crystal comprises a chiral smectic liquid crystal.

48. A device according to claim 28, wherein said liquid crystal comprises a ferroelectric liquid crystal.

49. A liquid crystal device, comprising:
a pair of electrode plates and a liquid crystal disposed between the electrode plates, at least one of said pair of electrode plates comprising a light-transmissive substrate; a plurality of metal electrodes disposed on the light-transmissive substrate with spacings therebetween; and an insulating layer disposed at the spacings, wherein
each of the metal electrodes includes a first layer comprising copper or silver; and
a second anti-oxidation layer comprising a metal or alloy selected from the group consisting of molybdenum, tantalum, tungsten, titanium, chromium, nickel and zinc and disposed on the first layer, and wherein
the anti-oxidation layer and the insulating layer as a whole form a substantially flat surface.

50. A device according to claim 49, wherein the second layer is disposed so as to coat only a surface opposite to a boundary surface between the first layer and the light-transmissive substrate.

51. A device according to claim 49, wherein the third layer is disposed so as to coat an entire exposed surface of the first layer.

52. A device according to claim 49, wherein the insulating layer comprises an ultraviolet-cured resin.

53. A device according to claim 49, wherein the first layer comprises copper.

54. A device according to claim 50, wherein the second layer comprises a metal or alloy selected from the group consisting of molybdenum, tantalum, tungsten, titanium, nickel and zinc.

55. A device according to claim 49, wherein the second layer comprises a metal or alloy selected from the group consisting of molybdenum, nickel and zinc.

56. A device according to claim 49, which further comprises an intermediate layer disposed between the first layer comprising a first metal and the second layer comprising a second metal, said intermediate layer comprising the first metal and the second metal.

57. A device according to claim 49, which further comprises a color filter layer disposed at the spacings between the metal electrodes and disposed between the light-transmissive substrate and the insulating layer.

58. A device according to claim 49, which further comprises a color filter layer disposed on the light-transmissive substrate, the metal electrodes and the insulating layer being disposed on the color filter layer.

59. A device according to claim 58, wherein the color filter layer includes a transparent portion.

60. A device according to claim 58, which further comprises a protective layer disposed on the color filter layer, the metal electrodes and the insulating layer being disposed on the protective layer.

61. A device according to claim 49, which further comprising a plurality of transparent electrodes disposed on the metal electrodes and the insulating layer.

62. A device according to claim 61, which further comprises an alignment control layer disposed so as to coat the transparent electrodes.

63. A device according to claim 49, wherein said liquid crystal comprises a chiral smectic liquid crystal.

64. A device according to claim 49, wherein said liquid crystal comprises a ferroelectric liquid crystal.

65. A process for producing an electrode plate comprising a light-transmissive substrate; a plurality of metal electrodes each including a first layer and a second layer, said metal electrodes being disposed on the light-transmissive substrate with spacings therebetween; and an insulating layer disposed at the spacings; said process comprising the steps of:
forming on the light-transmissive substrate said first layer comprising a metal or alloy selected from the group consisting of titanium, chromium, molybdenum, tungsten, aluminum, tantalum and nickel;
forming a second layer comprising copper or silver disposed on the first layer;
forming an anti-oxidation layer on the second layer; and
forming an insulating layer so that the insulating layer and the anti-oxidation layer as a whole form a substantially flat surface.

66. A process according to claim 65, wherein the second layer is formed by electroplating.

67. A process according to claim 65, which further comprises a step of forming on the second layer a third layer, constituting each of the metal electrodes, comprising a metal or alloy selected from the group consisting of molybdenum, tantalum, tungsten, titanium, chromium, nickel, aluminum and zinc.

68. A process according to claim 67, wherein the second and third layers are formed by electroplating.

69. A process for producing an electrode plate, comprising a light-transmissive substrate; a plurality of metal electrodes each including a first layer and a second layer, said metal electrodes being disposed on the light-transmissive substrate with spacings therebetween; and an insulating layer disposed at the spacings; said process for comprising the steps of:
forming on the light-transmissive substrate a first layer comprising copper or silver;
forming on the first layer a second anti-oxidation layer, comprising a metal or alloy selected from the group consisting of molybdenum, tantalum, tungsten, titanium, chromium, nickel, aluminum and zinc; and
forming an insulating layer so that the insulating layer and the anti-oxidation layer as a whole form a substantially flat surface.

70. A process for producing a liquid crystal device, comprising the steps of:
forming a pair of electrode plates each produced by any one of processes according to claims 65, 66 or 69,
disposing the electrode plate opposite to each other while leaving a gap therebetween, and
filling the gap with a liquid crystal.

* * * * *

UNITED STATES PATENT AND TRADEMARK OFFICE
CERTIFICATE OF CORRECTION

PATENT NO.   : 6,184,964 B1
DATED        : February 6, 2001
INVENTOR(S)  : Makoto Kameyama et al.

It is certified that error appears in the above-identified patent and that said Letters Patent is hereby corrected as shown below:

Title page,
Item [57] ABSTRACT, "chronium," should read -- chromium, --.

Column 1,
Line 19, "super twisted" should read -- super-twisted --.

Column 2,
Line 48, "tacts" should read -- tact --; and
Line 55, "is" should read -- are --.

Column 3,
Lines 18, 28 and 57, "chronium," should read -- chromium, --.

Column 4,
Lines 3 and 33, "chronium," should read -- chromium, --.

Column 6,
Line 15, "a a" should read -- as a --; and
Lines 19 and 53, "an" should read -- a --.

Column 7,
Line 5, "8brespectively" should read -- 8b respectively --.

Column 8,
Line 27, "15 was" should read -- and was --; and
Line 38, "palte" should read -- plate --.

Column 10,
Line 12, "adhesivenesses" should read -- adhesiveness --.

Column 12,
Line 66, "an" should read -- and --.

UNITED STATES PATENT AND TRADEMARK OFFICE
CERTIFICATE OF CORRECTION

PATENT NO. : 6,184,964 B1
DATED : February 6, 2001
INVENTOR(S) : Makoto Kameyama et al.

It is certified that error appears in the above-identified patent and that said Letters Patent is hereby corrected as shown below:

Column 13,
Line 11, "(though"" should read -- (though --; and
Line 13, "thus prepared" should read -- thus-prepared --.

Column 14,
Line 17, "comparison" should read -- comprising --;
Line 53, "an" should be deleted; and
Line 58, "include" should read -- includes --.

Column 15,
Line 31, "e" should read -- be --; and
Lines 35 and 37, "an" should read -- a --.

Column 16,
Line 5, "of" should read -- with --; and
Line 20, "is" should read -- are --.

Column 17,
Line 21, "was" should read -- were --;
Line 23, "or" should read -- of --; and
Line 26, "perform prevention of" should read -- preventing --.

Column 18,
Line 11, "an" should read -- a --; and
Line 47, "an" should read -- and --.

Column 19,
Line 27, "an" should be deleted; and
Line 28, "material" should read -- materials --.

Column 19,
Line 58, "prising" should read -- prises --.

UNITED STATES PATENT AND TRADEMARK OFFICE
CERTIFICATE OF CORRECTION

PATENT NO.    : 6,184,964 B1
DATED         : February 6, 2001
INVENTOR(S)   : Makoto Kameyama et al.

It is certified that error appears in the above-identified patent and that said Letters Patent is hereby corrected as shown below:

Column 22,
Line 20, "nickel and," should read -- and nickel, --.

Column 23,
Line 7, "prising" should read -- prises --.

Column 24,
Line 8, "prising" should read -- prises --; and
Line 62, "plate" should read -- plates --.

Signed and Sealed this

Fourteenth Day of May, 2002

*Attest:*

JAMES E. ROGAN
*Attesting Officer*   *Director of the United States Patent and Trademark Office*